United States Patent
Komori et al.

(10) Patent No.: US 8,255,119 B2
(45) Date of Patent: Aug. 28, 2012

(54) VEHICLE BODY SLIP ANGLE-ESTIMATING DEVICE AND METHOD AND ENGINE CONTROL UNIT

(75) Inventors: Takafumi Komori, Saitama-ken (JP); Shusuke Akazaki, Saitama-ken (JP); Takahide Mizuno, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 1168 days.

(21) Appl. No.: 12/081,550

(22) Filed: Apr. 17, 2008

(65) Prior Publication Data

US 2008/0262677 A1 Oct. 23, 2008

(30) Foreign Application Priority Data

Apr. 18, 2007 (JP) ................................. 2007-109357

(51) Int. Cl.
 *B60G 17/016* (2006.01)
(52) U.S. Cl. ................ 701/38; 701/36; 701/37; 701/41; 701/70; 701/72
(58) Field of Classification Search .......................... None
See application file for complete search history.

(56) References Cited

U.S. PATENT DOCUMENTS

| | | | | |
|---|---|---|---|---|
| 5,483,446 A | * | 1/1996 | Momose et al. | 701/1 |
| 5,555,499 A | * | 9/1996 | Yamashita et al. | 701/84 |
| 5,579,245 A | * | 11/1996 | Kato | 702/150 |
| 5,944,393 A | * | 8/1999 | Sano | 303/146 |
| 5,964,819 A | * | 10/1999 | Naito | 701/72 |
| 6,015,192 A | * | 1/2000 | Fukumura | 303/140 |
| 6,374,172 B1 | * | 4/2002 | Yamaguchi et al. | 701/90 |
| 2002/0007239 A1 | * | 1/2002 | Matsumoto et al. | 701/41 |
| 2002/0075139 A1 | * | 6/2002 | Yamamoto et al. | 340/436 |
| 2003/0195689 A1 | * | 10/2003 | Mori | 701/70 |
| 2004/0128060 A1 | * | 7/2004 | Park | 701/124 |
| 2005/0027402 A1 | * | 2/2005 | Koibuchi et al. | 701/1 |
| 2006/0015239 A1 | * | 1/2006 | Higuchi | 701/72 |
| 2006/0089771 A1 | * | 4/2006 | Messih et al. | 701/45 |
| 2007/0067080 A1 | * | 3/2007 | Messih et al. | 701/37 |
| 2008/0243335 A1 | * | 10/2008 | Rao et al. | 701/38 |

FOREIGN PATENT DOCUMENTS

| | | |
|---|---|---|
| EP | 0 615 892 A1 | 9/1994 |
| JP | 07-025327 | 1/1995 |

OTHER PUBLICATIONS

European Search Report, European Application No. 08007328.1-1523, Date of Completion: Jun. 9, 2008, pp. 1-7.

* cited by examiner

*Primary Examiner* — Khoi Tran
*Assistant Examiner* — Jonathan L Sample
(74) *Attorney, Agent, or Firm* — Squire Sanders (US) LLP

(57) ABSTRACT

A vehicle body slip angle-estimating device which, in estimating a vehicle body slip angle with an algorithm using a nonlinear model, is capable of accurately estimating a vehicle body slip angle irrespective of whether the frequency of occurrence of a state during traveling of the vehicle. A basic value-calculating section calculates a basic value of a vehicle body slip angle with an algorithm using a neural network model. A turning state-determining section determines whether the vehicle is in a predetermined limit turning traveling state. A correction value-calculating section calculates a correction value with an algorithm using a predetermined linear model when the vehicle is in the predetermined state. In the other cases, the correction value is set to 0. A straight traveling-determining section sets the angle to the sum of the basic value and the correction value when the vehicle is in a turning traveling state.

30 Claims, 11 Drawing Sheets

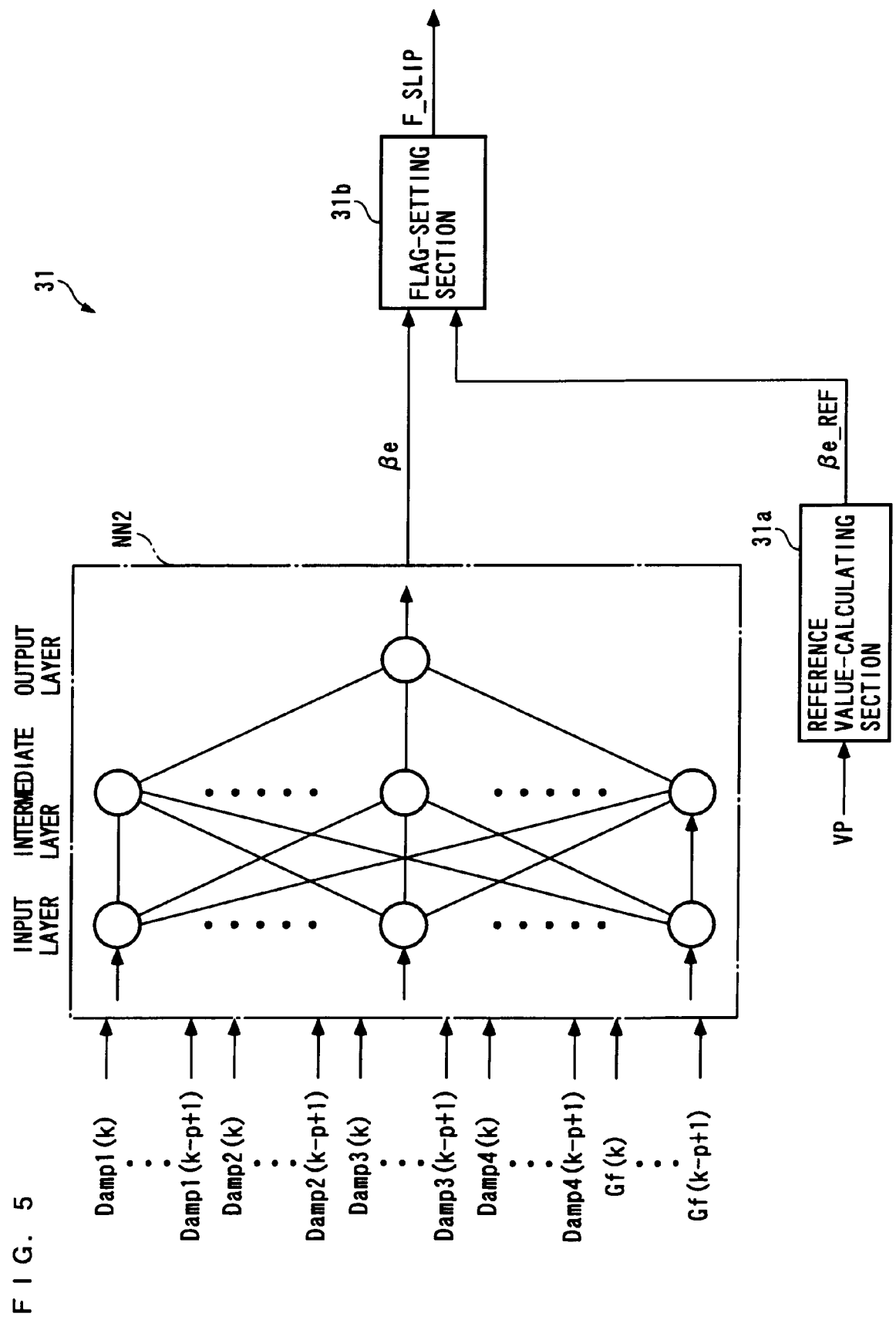
F I G. 5

F I G. 7 A   S_DB
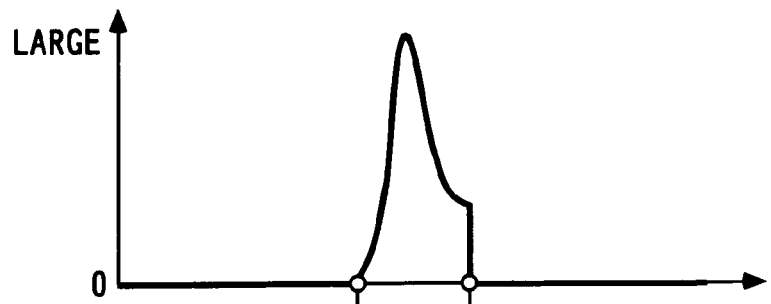
F I G. 7 B   βb
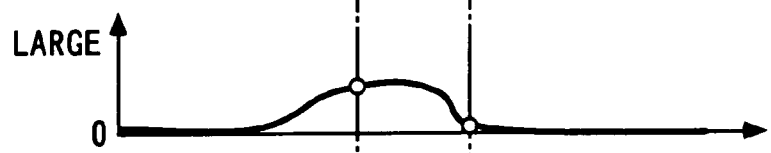
F I G. 7 C   β (=βb+βc)
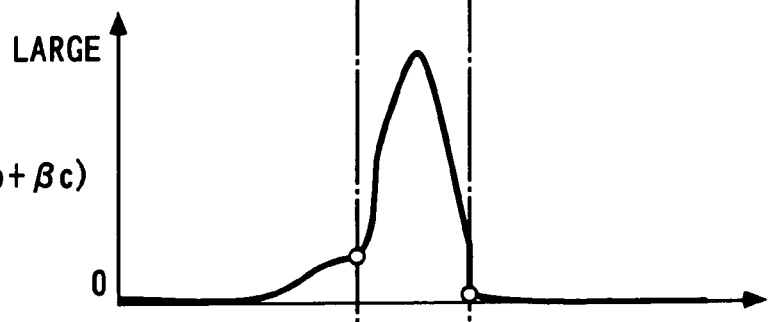
F I G. 7 D   β'
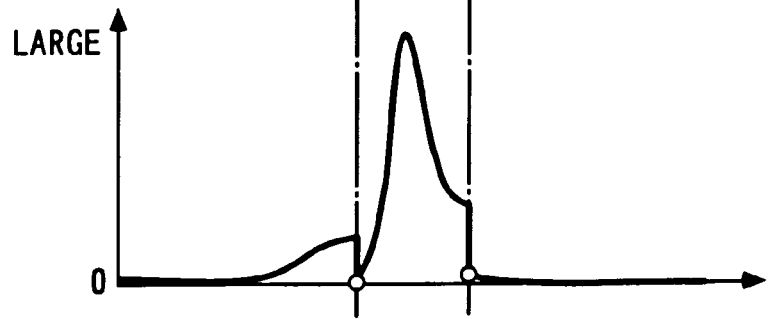
F I G. 7 E   F_SLIP
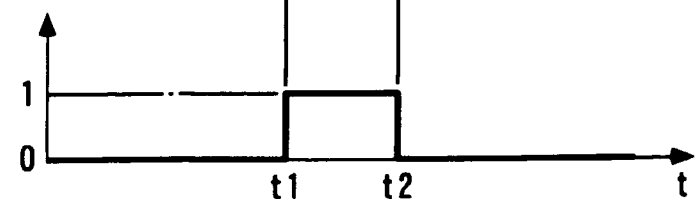

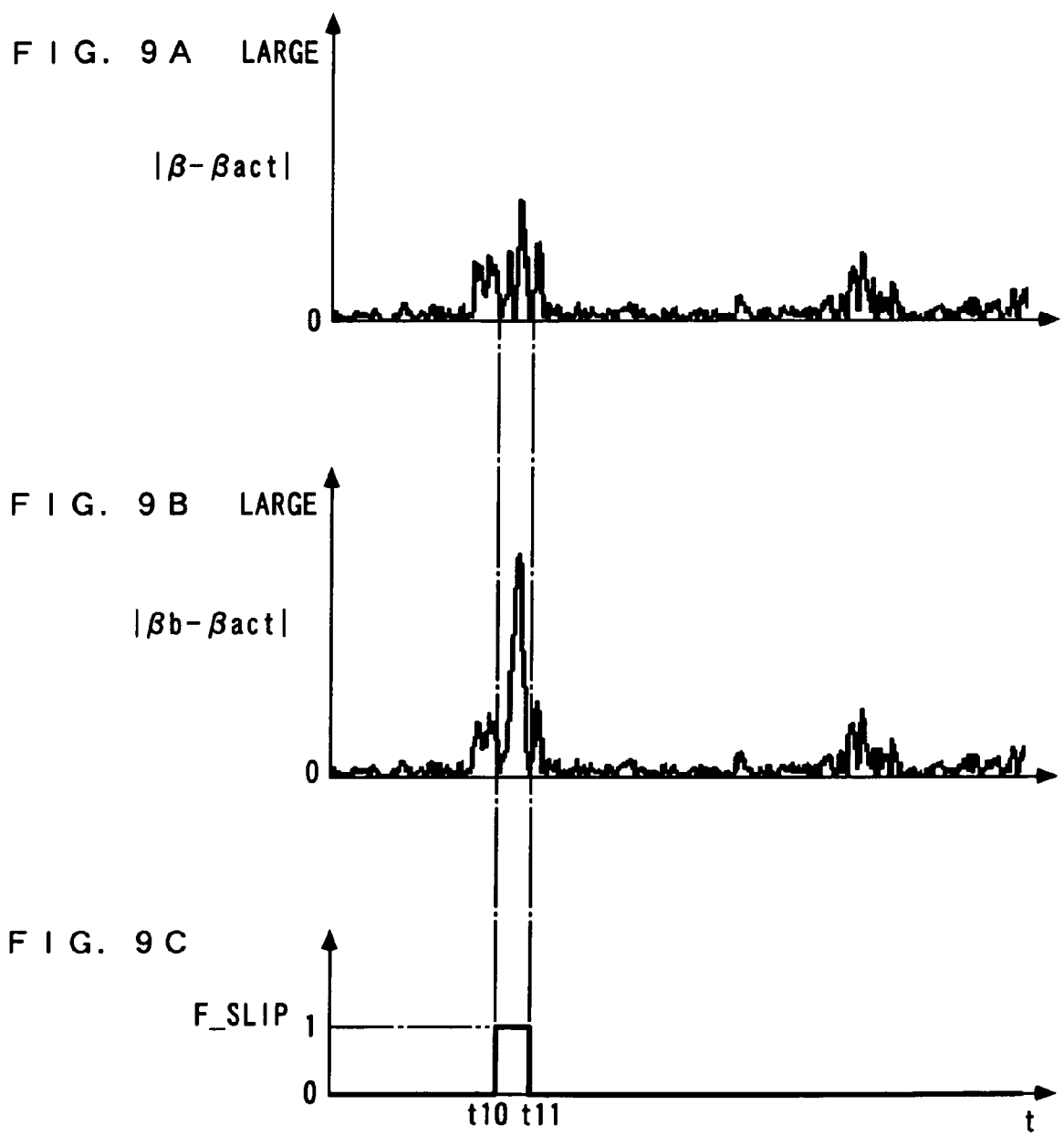

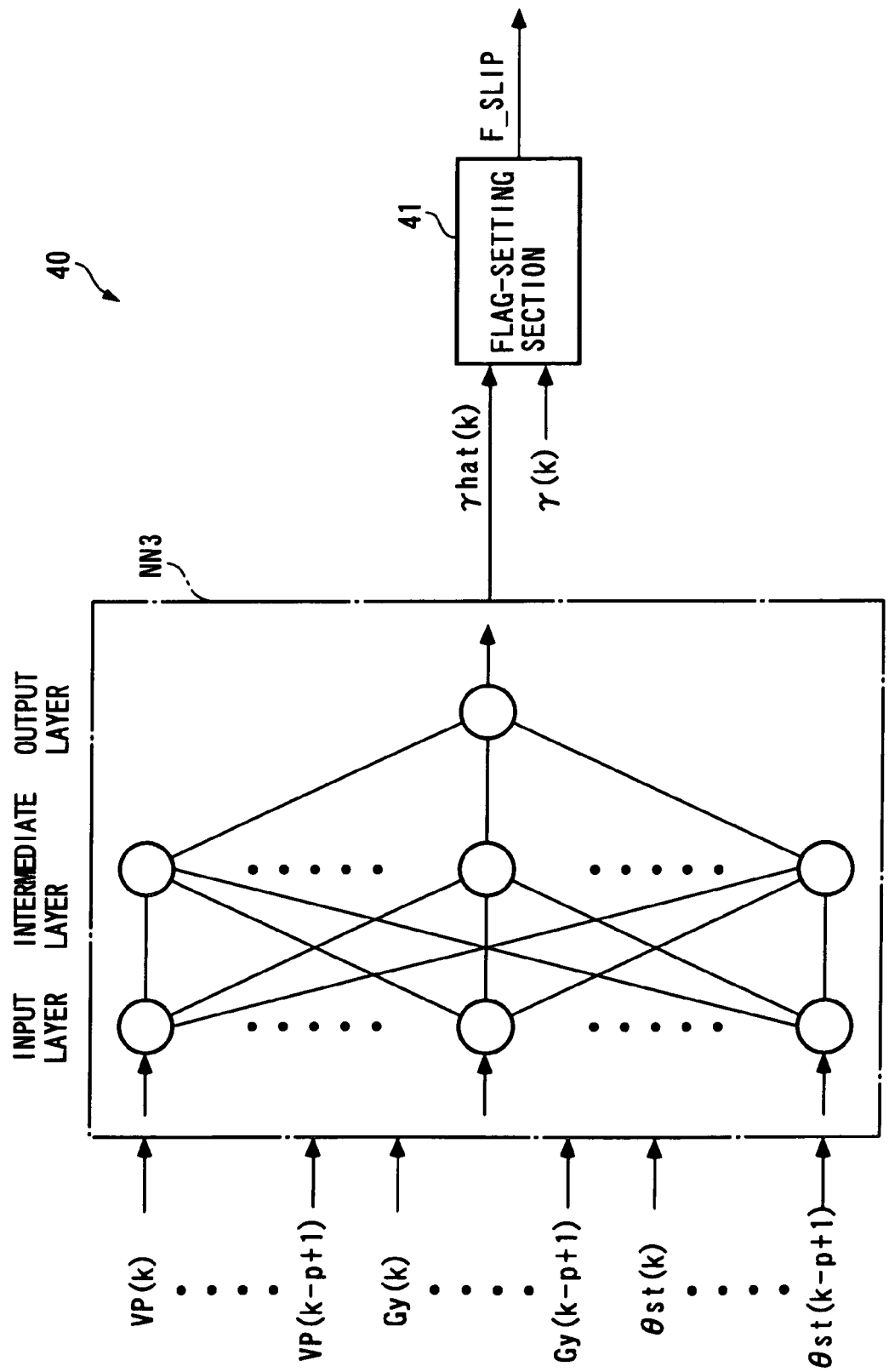

VEHICLE BODY SLIP ANGLE-ESTIMATING DEVICE AND METHOD AND ENGINE CONTROL UNIT

BACKGROUND OF THE INVENTION

1. Field of the Invention

The present invention relates to a vehicle body slip angle-estimating device and method for estimating a vehicle body slip angle with an algorithm using a nonlinear model, and an engine control unit.

2. Description of the Related Art

Conventionally, there has been proposed a vehicle body slip angle-estimating device that estimates a vehicle body slip angle e.g. in Japanese Laid-Open Patent Publication (Kokai) No. H07-25327. This vehicle body slip angle-estimating device is provided with a yaw rate sensor for detecting the yaw rate of a vehicle, a steering angle sensor for detecting the steering angle of the steering of the vehicle, and a vehicle speed sensor for detecting a vehicle speed.

In the vehicle body slip angle-estimating device, as described hereinafter, a vehicle body slip angle is estimated with an algorithm using a neural network model as a nonlinear model. First, the amount of change in an estimated value of the vehicle body slip angle is calculated using a neural network model shown in FIG. 13 of the publication to which are input the immediately preceding estimated value of the vehicle body slip angle, a yaw rate, the steering angle of front wheels, that of rear wheels, the reciprocal of the vehicle speed, and the reciprocal of the square of the vehicle speed, and from which is output the amount of change in the estimated value of the vehicle body slip angle. Then, the current estimated value of the vehicle body slip angle is calculated by adding the immediately preceding estimated value to the amount of change in the estimated value of the vehicle body slip angle.

The weights of an intermediate layer and an output layer of the FIG. 13 neural network model are learned in the following manner: Using a neural network model shown in FIG. 14 of the publication to which are input the yaw rate, the steering angle of the front wheels, that of the rear wheels, the reciprocal of the vehicle speed, the reciprocal of the square of the vehicle speed, a frictional resistance, all these inputs being obtained when the vehicle is actually traveling on a curved road, and from which are output the estimated value of the vehicle body slip angle and an estimated yaw rate, the weights of the intermediate layer and the output layer are learned such that the estimated value of the vehicle body slip angle and the estimated yaw rate become equal to the measured value of the vehicle body slip angle and the measured value of the yaw rate, respectively.

According to the above-described conventional vehicle body slip angle-estimating device, the vehicle body slip angle is estimated with the algorithm using the neural network model, and the learned values of the weights of the respective layers of the neural network model are calculated based on the measured values of the yaw rate, the steering angle of the front wheels, and so forth, all of which are obtained during traveling of the vehicle on a curved road. Therefore, when the vehicle is in a traveling state which is to be associated with measured values of the above-mentioned parameters occurring with a low frequency, such as a limit turning traveling state in which an excessively large vehicle body slip angle is temporarily generated, the calculation accuracy of the learned values of the weights is low and hence the estimation accuracy of the vehicle body slip angle is also degraded.

SUMMARY OF THE INVENTION

It is an object of the present invention to provide a vehicle body slip angle-estimating device and method, and an engine control unit which, in estimating a vehicle body slip angle with an algorithm using a nonlinear model, is capable of accurately estimating a vehicle body slip angle irrespective of whether the frequency of occurrence of a vehicle traveling state is high or low.

To attain the above object, in a first aspect of the present invention, there is provided a vehicle body slip angle-estimating device comprising vehicle speed-detecting means for detecting a speed of a vehicle as a vehicle speed, lateral acceleration-detecting means for detecting a lateral acceleration of the vehicle as a lateral acceleration, yaw rate-detecting means for detecting a yaw rate of the vehicle, estimated value-calculating means for calculating an estimated value of a vehicle body slip angle with an algorithm that uses a predetermined nonlinear model indicative of a relationship between the vehicle speed, the lateral acceleration, the yaw rate, and the vehicle body slip angle, correction means for calculating a correction value with an algorithm that uses a predetermined linear model indicative of the relationship between the vehicle speed, the lateral acceleration, the yaw rate, and the vehicle body slip angle, and correcting the estimated value by the calculated correction value, determination means for determining whether or not the vehicle is in a predetermined turning traveling state; and selection means for selecting the estimated value as the vehicle body slip angle when the determination means has determined that the vehicle is not in the predetermined turning traveling state, and selecting the estimated value corrected by the correction value as the vehicle body slip angle when the determination means has determined that the vehicle is in the predetermined turning traveling state.

With the configuration of the vehicle body slip angle-estimating device according to the first aspect of the present invention, the estimated value of the vehicle body slip angle is calculated with the algorithm that uses the predetermined nonlinear model indicative of the relationship between the vehicle speed, the lateral acceleration, the yaw rate, and the vehicle body slip angle, and the correction value is calculated with the algorithm using the predetermined linear model that is indicative of the relationship between the vehicle speed, the lateral acceleration, the yaw rate, and the vehicle body slip angle. Further, when it is determined that the vehicle is not in the predetermined turning traveling state, the estimated value is selected as the vehicle body slip angle, whereas when it is determined that the vehicle is in the predetermined turning traveling state, the estimated value corrected by the correction value is selected as the vehicle body slip angle. Therefore, for example, assuming that the predetermined turning traveling state is a turning traveling state of the vehicle which occurs with a low frequency, by performing system identification of the nonlinear model using values input to and output from the nonlinear model which are actually measured during turning traveling in a state which occurs with a high frequency, it is possible to accurately calculate the estimated value of the vehicle body slip angle.

On the other hand, when the vehicle is in the turning traveling state which occurs with a low frequency, which causes an increase in a modeling error of the nonlinear model, the correction value is calculated with the algorithm that uses the predetermined linear model indicative of the relationship between the vehicle speed, the lateral acceleration, the yaw rate, and the vehicle body slip angle, and the estimated value corrected by the correction value is selected as the vehicle body slip angle. More specifically, when the vehicle is in the turning traveling state which occurs with a low frequency, the correction value is calculated using the linear model with is smaller in modeling error than the nonlinear model, and the vehicle body slip angle is calculated by correcting the estimated value by the thus calculated correction value. Therefore, compared with a case in which the estimated value calculated with the algorithm using the predetermined nonlinear model is directly used, it is possible to enhance the estimation accuracy of the vehicle body slip angle. Thus, the vehicle body slip angle can be accurately estimated irrespective of whether the frequency of occurrence of a turning traveling state of the vehicle is high or low.

Preferably, the predetermined nonlinear model is a predetermined neural network model, and the algorithm using the predetermined linear model is an algorithm including a pseudo-integration method.

With the configuration of this preferred embodiment, when it is determined that the vehicle is not in the predetermined turning traveling state, the estimated value calculated with the algorithm using the predetermined neural network model is selected as the vehicle body slip angle. Therefore, for example, assuming that the predetermined turning traveling state is a turning traveling state of the vehicle which occurs with a low frequency, when the vehicle is in a turning traveling state which occurs with a high frequency, the vehicle body slip angle can be accurately estimated with the algorithm using the predetermined neural network model. Further, when it is determined that the vehicle is in the predetermined turning traveling state, the estimated value corrected by the correction value calculated with the algorithm including the pseudo-integration method is selected as the vehicle body slip angle. In this case, when the pseudo-integration method is used, the robustness with respect to a change in a road surface µ is higher than when the neural network model is used, so that if the estimated value calculated with the algorithm using the neural network model is corrected by the correction value calculated as above, the estimation accuracy of the vehicle body slip angle can be enhanced even when the vehicle is in the turning traveling state of the vehicle which occurs with a low frequency. Thus, it is possible to realize the vehicle body slip angle-estimating device which is capable of estimating the vehicle body slip angle with high accuracy, by using the neural network model and the pseudo-integration method, irrespective of whether the frequency of occurrence of the turning traveling state of the vehicle is high or low.

More preferably, the correction means calculates the correction value by multiplying a value calculated by the pseudo-integration method by a predetermined gain.

With the configuration of this preferred embodiment, the correction value is calculated by multiplying the value calculated by the pseudo-integration method by the predetermined gain. Therefore, by setting the predetermined gain such that the estimated value corrected by the correction value becomes equal to an actual vehicle body slip angle, it is possible to further enhance the estimation accuracy of the vehicle body slip angle.

Preferably, the vehicle body slip angle-estimating device further comprises straight traveling-determining means for determining whether or not the vehicle is in a straight traveling state, and setting means for setting the vehicle body slip angle to a value selected by the selection means when the straight traveling-determining means has determined that the vehicle is not in the straight traveling state, and setting the vehicle body slip angle to 0 when the straight traveling-determining means has determined that the vehicle is in the straight traveling state.

With the configuration of this preferred embodiment, when the vehicle is in the straight traveling state, the vehicle body slip angle is set to 0. This makes it possible to prevent the calculated value of the vehicle body slip angle in the straight traveling state of the vehicle from being reflected on the estimated value of the vehicle body slip angle, thereby making it possible to further enhance the estimation accuracy of the vehicle body slip angle.

More preferably, the vehicle body slip angle-estimating device further comprises accelerator pedal opening-detecting means for detecting an accelerator pedal opening indicative of an operation amount of an accelerator pedal of the vehicle, and steering angle-detecting means for detecting a steering angle of a steering wheel of the vehicle, and the straight traveling-determining means determines whether or not the vehicle is in the straight traveling state, based on results of comparison of the accelerator pedal opening and the steering angle with respective predetermined reference values thereof.

In general, in determining whether or not the vehicle is in the straight traveling state, by combining the result of comparison between the accelerator pedal opening and the predetermined reference value thereof, with the result of comparison between the steering angle and the predetermined reference value thereof, it is possible to relatively accurately perform the determination. Therefore, with the configuration of this preferred embodiment, the above method makes it possible to accurately determine whether or not the vehicle is in the straight traveling state, thereby making it possible to further enhance the estimation accuracy of the vehicle body slip angle.

To attain the above object, in a second aspect of the present invention, there is provided a vehicle body slip angle-estimating device comprising vehicle speed-detecting means for detecting a speed of a vehicle as a vehicle speed, lateral acceleration-detecting means for detecting a lateral acceleration of the vehicle as a lateral acceleration, yaw rate-detecting means for detecting a yaw rate of the vehicle, first estimation means for estimating a first vehicle body slip angle with an algorithm that uses a first predetermined nonlinear model of which system identification is performed when the vehicle is not in a predetermined turning traveling state and which is indicative of a relationship between the vehicle speed, the lateral acceleration, the yaw rate, and a vehicle body slip angle, second estimation means for estimating a second vehicle body slip angle with an algorithm that uses a second predetermined nonlinear model of which system identification is performed when the vehicle is in the predetermined turning traveling state and is indicative of the relationship between the vehicle speed, the lateral acceleration, the yaw rate, and the vehicle body slip angle, determination means for determining whether or not the vehicle is in the predetermined turning traveling state, and selection means for selecting the first vehicle body slip angle as the vehicle body slip angle when the determination means has determined that the vehicle is not in the predetermined turning traveling state, and selecting the second vehicle body slip angle as the vehicle body slip angle when the determination means has determined that the vehicle is in the predetermined turning traveling state.

With the configuration of the vehicle body slip angle-estimating device according to the second aspect of the present invention, the first vehicle body slip angle is estimated with the algorithm that uses the first predetermined nonlinear model of which system identification is performed when the vehicle is not in the predetermined turning traveling state and which is indicative of the relationship between the vehicle speed, the lateral acceleration, the yaw rate, and the vehicle body slip angle, and the second vehicle body slip angle is estimated with an algorithm that uses a second predetermined nonlinear model of which system identification is performed when the vehicle is in the predetermined turning traveling state and which is indicative of the relationship between the vehicle speed, the lateral acceleration, the yaw rate, and the vehicle body slip angle. Further, when it is determined that the vehicle is not in the predetermined turning traveling state, the first vehicle body slip angle is selected as the vehicle body slip angle, whereas when it is determined that the vehicle is in the predetermined turning traveling state, the second vehicle body slip angle is selected as the vehicle body slip angle. Therefore, for example, assuming that the predetermined turning traveling state is a turning traveling state of the vehicle which occurs with a low frequency, by performing system identification of the second nonlinear model using values input to and output from the second nonlinear model which are actually measured in the turning traveling state of the vehicle which occurs with a low frequency, and by performing system identification of the first nonlinear model using values input to and output from the first nonlinear model which are actually measured in a turning traveling sate of the vehicle which occurs with a high frequency, it is possible to reduce the modeling errors of both the first and second nonlinear models, thereby making it possible to estimate the first and second vehicle body slip angles with high accuracy.

On the other hand, inversely to the above, even when the predetermined turning traveling state is a turning traveling state of the vehicle which occurs with a high frequency, by performing system identification of the second nonlinear model using values input to and output from the second nonlinear model which are actually measured in the turning traveling state of the vehicle which occurs with a high frequency, and by performing system identification of the first nonlinear model using values input to and output from the first nonlinear model which are actually measured in the turning traveling state of the vehicle which occurs with a low frequency, it is possible to reduce the modeling errors of both the first and second nonlinear models, thereby making it possible to estimate the first and second vehicle body slip angles with high accuracy. Thus, the vehicle body slip angle can be accurately estimated irrespective of whether the frequency of occurrence of the turning traveling state of the vehicle is high or low.

Preferably, the first predetermined nonlinear model is a first predetermined neural network model that uses weights learned when the vehicle is not in the predetermined turning traveling state, and the second predetermined nonlinear model is a second predetermined neural network model that uses weights learned when the vehicle is in the predetermined turning traveling state.

With the configuration of this preferred embodiment, when the vehicle is not in the predetermined turning traveling state, the first vehicle body slip angle is estimated with an algorithm using the first predetermined neural network model. In this first predetermined neural network model, the weights that are learned when the vehicle is not in the predetermined turning traveling state are used, and hence the relationship between inputs and outputs exhibited when the vehicle is not in the predetermined turning traveling state can be accurately reflected on the model, whereby it is possible to accurately estimate the first vehicle body slip angle. Further, when the vehicle is in the predetermined turning traveling state, the second vehicle body slip angle is calculated with an algorithm using the second predetermined neural network model. In this second predetermined neural network model, at least the weights that are learned when the vehicle is in the predetermined turning traveling state are used, and hence the relationship between inputs and outputs exhibited when the vehicle is in the predetermined turning traveling state can be accurately reflected on the model, whereby it is possible to accurately estimate the second vehicle body slip angle. As a consequence, it is possible to accurately estimate the first and second vehicle body slip angles whether the predetermined turning traveling state may be a state which occurs with a high frequency or a state which occurs with a low frequency. Thus, it is possible to realize the vehicle body slip angle-estimating device which is capable of estimating the vehicle body slip angles with high accuracy, using the two neural network models, irrespective of whether the frequency of occurrence of the turning traveling state of the vehicle is high or low.

Preferably, the determination means determines whether or not the vehicle is in the predetermined turning traveling state, based on one of a relative difference and a ratio between the first vehicle body slip angle and the second vehicle body slip angle.

With the configuration of this preferred embodiment, it is determined whether or not the vehicle is in the predetermined turning traveling state, based on one of the relative difference and the ratio between the first and second vehicle body slip angles. Therefore, it is possible to determine whether or not the vehicle is in the predetermined turning traveling state without using a special detection means other than the vehicle speed-detecting means, the lateral acceleration-detecting means, or the yaw rate-detecting means. This makes it possible to reduce manufacturing costs of the vehicle body slip angle-estimating device.

Preferably, the vehicle body slip angle-estimating device further comprises straight traveling-determining means for determining whether or not the vehicle is in a straight traveling state, and setting means for setting the vehicle body slip angle to a value selected by the selection means when the straight traveling-determining means has determined that the vehicle is not in the straight traveling state, and setting the vehicle body slip angle to 0 when the straight traveling-determining means has determined that the vehicle is in the straight traveling state.

With the configuration of this preferred embodiment, when the vehicle is in the straight traveling state, the vehicle body slip angle is set to 0. This makes it possible to prevent the calculated value of the vehicle body slip angle in the straight traveling state of the vehicle from being reflected on the first and second vehicle body slip angles, thereby making it possible to further enhance the estimation accuracy of the vehicle body slip angle.

More preferably, the vehicle body slip angle-estimating device further comprises accelerator pedal opening-detecting means for detecting an accelerator pedal opening indicative of an operation amount of an accelerator pedal of the vehicle, and steering angle-detecting means for detecting a steering angle of a steering wheel of the vehicle, and the straight traveling-determining means determines whether or not the vehicle is in the straight traveling state, based on results of comparison of the accelerator pedal opening and the steering angle with respective predetermined reference values thereof.

In general, in determining whether or not the vehicle is in the straight traveling state, by combining the result of comparison between the accelerator pedal opening and the predetermined reference value thereof, with the result of comparison between the steering angle and the predetermined reference value thereof, it is possible to relatively accurately perform the determination. Therefore, with the configuration of this preferred embodiment, the above method makes it possible to accurately determine whether or not the vehicle is in the straight traveling state, thereby making it possible to further enhance the estimation accuracy of the vehicle body slip angle.

To attain the above object, in a third aspect of the present invention, there is provided a vehicle body slip angle-estimating method comprising a vehicle speed-detecting step of detecting a speed of a vehicle as a vehicle speed, a lateral acceleration-detecting step of detecting a lateral acceleration of the vehicle as a lateral acceleration, a yaw rate-detecting step of detecting a yaw rate of the vehicle, an estimated value-calculating step of calculating an estimated value of a vehicle body slip angle with an algorithm that uses a predetermined nonlinear model indicative of a relationship between the vehicle speed, the lateral acceleration, the yaw rate, and the vehicle body slip angle, a correction step of calculating a correction value with an algorithm that uses a predetermined linear model indicative of the relationship between the vehicle speed, the lateral acceleration, the yaw rate, and the vehicle body slip angle, and correcting the estimated value by the calculated correction value, a determination step of determining whether or not the vehicle is in a predetermined turning traveling state, and a selection step of selecting the estimated value as the vehicle body slip angle when it is determined in the determination step that the vehicle is not in the predetermined turning traveling state, and selecting the estimated value corrected by the correction value as the vehicle body slip angle when it is determined in the determination step that the vehicle is in the predetermined turning traveling state.

With the configuration of the vehicle body slip angle-estimating method according to the third aspect of the present invention, it is possible to obtain the same advantageous effects as provided by the first aspect of the present invention.

Preferably, the predetermined nonlinear model is a predetermined neural network model, and the algorithm using the predetermined linear model is an algorithm including a pseudo-integration method.

More preferably, the correction step includes calculating the correction value by multiplying a value calculated by the pseudo-integration method by a predetermined gain.

Preferably, the vehicle body slip angle-estimating method further comprises a straight traveling-determining step of determining whether or not the vehicle is in a straight traveling state, a setting step of setting the vehicle body slip angle to a value selected in the selection step when it is determined in the straight traveling-determining step that the vehicle is not in the straight traveling state, and setting the vehicle body slip angle to 0 when it is determined in the straight traveling-determining step that the vehicle is in the straight traveling state.

More preferably, the vehicle body slip angle-estimating method further comprises an accelerator pedal opening-detecting step of detecting an accelerator pedal opening indicative of an operation amount of an accelerator pedal of the vehicle, and a steering angle-detecting step of detecting a steering angle of a steering wheel of the vehicle, and the straight traveling-determining step includes determining whether or not the vehicle is in the straight traveling state, based on results of comparison of the accelerator pedal opening and the steering angle with respective predetermined reference values thereof.

With the configurations of these preferred embodiments, it is possible to obtain the same advantageous effects as provided by the respective corresponding preferred embodiments of the first aspect of the present invention.

To attain the above object, in a fourth aspect of the present invention, there is provided a vehicle body slip angle-estimating method comprising a vehicle speed-detecting step of detecting a speed of a vehicle as a vehicle speed, a lateral acceleration-detecting step of detecting a lateral acceleration of the vehicle as a lateral acceleration, a yaw rate-detecting step of detecting a yaw rate of the vehicle, a first estimation step of estimating a first vehicle body slip angle with an algorithm that uses a first predetermined nonlinear model of which system identification is performed when the vehicle is not in a predetermined turning traveling state and which is indicative of a relationship between the vehicle speed, the lateral acceleration, the yaw rate, and a vehicle body slip angle, a second estimation step of estimating a second vehicle body slip angle with an algorithm that uses a second predetermined nonlinear model of which system identification is performed when the vehicle is in the predetermined turning traveling state and which is indicative of the relationship between the vehicle speed, the lateral acceleration, the yaw rate, and the vehicle body slip angle, a determination step of determining whether or not the vehicle is in the predetermined turning traveling state, and a selection step of selecting the first vehicle body slip angle as the vehicle body slip angle when it is determined in the determination step that the vehicle is not in the predetermined turning traveling state, and selecting the second vehicle body slip angle as the vehicle body slip angle when it is determined in the determination step that the vehicle is in the predetermined turning traveling state.

With the configuration of the vehicle body slip angle-estimating method according to the fourth aspect of the present invention, it is possible to obtain the same advantageous effects as provided by the second aspect of the present invention.

Preferably, the first predetermined nonlinear model is a first predetermined neural network model that uses weights learned when the vehicle is not in the predetermined turning traveling state, and the second predetermined nonlinear model is a second predetermined neural network model that uses weights learned when the vehicle is in the predetermined turning traveling state.

Preferably, the determination step includes determining whether or not the vehicle is in the predetermined turning traveling state, based on one of a relative difference and a ratio between the first vehicle body slip angle and the second vehicle body slip angle.

Preferably, the vehicle body slip angle-estimating method further comprises a straight traveling-determining step of determining whether or not the vehicle is in a straight traveling state, and a setting step of setting the vehicle body slip angle to a value selected in the selection step when it is determined in the straight traveling-determining step that the vehicle is not in the straight traveling state, and setting the vehicle body slip angle to 0 when it is determined in the straight traveling-determining step that the vehicle is in the straight traveling state.

More preferably, the vehicle body slip angle-estimating method further comprises an accelerator pedal opening-detecting step of detecting an accelerator pedal opening indicative of an operation amount of an accelerator pedal of the vehicle, and a steering angle-detecting step of detecting a steering angle of a steering wheel of the vehicle, and the straight traveling-determining step includes determining whether or not the vehicle is in the straight traveling state, based on results of comparison of the accelerator pedal opening and the steering angle with respective predetermined reference values thereof.

With the configurations of these preferred embodiments, it is possible to obtain the same advantageous effects as provided by the respective corresponding preferred embodiments of the second aspect of the present invention.

To attain the above object, in a fifth aspect of the present invention, there is provided an engine control unit including a control program for causing a computer to execute a vehicle body slip angle-estimating method, wherein the vehicle body slip angle-estimating method comprises a vehicle speed-detecting step of detecting a speed of a vehicle as a vehicle speed, a lateral acceleration-detecting step of detecting a lateral acceleration of the vehicle as a lateral acceleration a yaw rate-detecting step of detecting a yaw rate of the vehicle, an estimated value-calculating step of calculating an estimated value of a vehicle body slip angle with an algorithm that uses a predetermined nonlinear model indicative of a relationship between the vehicle speed, the lateral acceleration, the yaw rate, and the vehicle body slip angle, a correction step of calculating a correction value with an algorithm that uses a predetermined linear model indicative of the relationship between the vehicle speed, the lateral acceleration, the yaw rate, and the vehicle body slip angle, and correcting the estimated value by the calculated correction value, a determination step of determining whether or not the vehicle is in a predetermined turning traveling state, and a selection step of selecting the estimated value as the vehicle body slip angle when it is determined in the determination step that the vehicle is not in the predetermined turning traveling state, and selecting the estimated value corrected by the correction value as the vehicle body slip angle when it is determined in the determination step that the vehicle is in the predetermined turning traveling state.

With the configuration of the vehicle body slip angle-estimating method according to the fifth aspect of the present invention, it is possible to obtain the same advantageous effects as provided by the first aspect of the present invention.

Preferably, the predetermined nonlinear model is a predetermined neural network model, and the algorithm using the predetermined linear model is an algorithm including a pseudo-integration method.

More preferably, the correction step includes calculating the correction value by multiplying a value calculated by the pseudo-integration method by a predetermined gain.

Preferably, the vehicle body slip angle-estimating method further comprises a straight traveling-determining step of determining whether or not the vehicle is in a straight traveling state, and a setting step of setting the vehicle body slip angle to a value selected in the selection step when it is determined in the straight traveling-determining step that the vehicle is not in the straight traveling state, and setting the vehicle body slip angle to 0 when it is determined in the straight traveling-determining step that the vehicle is in the straight traveling state.

More preferably, the vehicle body slip angle-estimating method further comprises further comprises an accelerator pedal opening-detecting step of detecting an accelerator pedal opening indicative of an operation amount of an accelerator pedal of the vehicle, and a steering angle-detecting step of detecting a steering angle of a steering wheel of the vehicle, and the straight traveling-determining step includes determining whether or not the vehicle is in the straight traveling state, based on results of comparison of the accelerator pedal opening and the steering angle with respective predetermined reference values thereof.

With the configurations of these preferred embodiments, it is possible to obtain the same advantageous effects as provided by the respective corresponding preferred embodiments of the first aspect of the present invention.

To attain the above object, in a sixth aspect of the present invention, there is provided an engine control unit including a control program for causing a computer to execute a vehicle body slip angle-estimating method, wherein the vehicle body slip angle-estimating method comprises a vehicle speed-detecting step of detecting a speed of a vehicle as a vehicle speed, a lateral acceleration-detecting step of detecting a lateral acceleration of the vehicle as a lateral acceleration, a yaw rate-detecting step of detecting a yaw rate of the vehicle, a first estimation step of estimating a first vehicle body slip angle with an algorithm that uses a first predetermined nonlinear model of which system identification is performed when the vehicle is not in a predetermined turning traveling state and which is indicative of a relationship between the vehicle speed, the lateral acceleration, the yaw rate, and a vehicle body slip angle, a second estimation step of estimating a second vehicle body slip angle with an algorithm that uses a second predetermined nonlinear model of which system identification is performed when the vehicle is in the predetermined turning traveling state and which is indicative of the relationship between the vehicle speed, the lateral acceleration, the yaw rate, and the vehicle body slip angle, a determination step of determining whether or not the vehicle is in the predetermined turning traveling state, and a selection step of selecting the first vehicle body slip angle as the vehicle body slip angle when it is determined in the determination step that the vehicle is not in the predetermined turning traveling state, and selecting the second vehicle body slip angle as the vehicle body slip angle when it is determined in the determination step that the vehicle is in the predetermined turning traveling state.

With the configuration of the vehicle body slip angle-estimating method according to the sixth aspect of the present invention, it is possible to obtain the same advantageous effects as provided by the second aspect of the present invention.

Preferably, the first predetermined nonlinear model is a first predetermined neural network model that uses weights learned when the vehicle is not in the predetermined turning traveling state, and the second predetermined nonlinear model is a second predetermined neural network model that uses weights learned when the vehicle is in the predetermined turning traveling state.

Preferably, the determination step includes determining whether or not the vehicle is in the predetermined turning traveling state, based on one of a relative difference and a ratio between the first vehicle body slip angle and the second vehicle body slip angle.

Preferably, the vehicle body slip angle-estimating method further comprises a straight traveling-determining step of determining whether or not the vehicle is in a straight traveling state, and a setting step of setting the vehicle body slip angle to a value selected in the selection step when it is determined in the straight traveling-determining step that the vehicle is not in the straight traveling state, and setting the vehicle body slip angle to 0 when it is determined in the straight traveling-determining step that the vehicle is in the straight traveling state.

More preferably, the vehicle body slip angle-estimating method further comprises an accelerator pedal opening-detecting step of detecting an accelerator pedal opening indicative of an operation amount of an accelerator pedal of the vehicle, and a steering angle-detecting step of detecting a steering angle of a steering wheel of the vehicle, and the straight traveling-determining step includes determining whether or not the vehicle is in the straight traveling state, based on results of comparison of the accelerator pedal opening and the steering angle with respective predetermined reference values thereof.

With the configurations of these preferred embodiments, it is possible to obtain the same advantageous effects as provided by the respective corresponding preferred embodiments of the second aspect of the present invention.

The above and other objects, features, and advantages of the present invention will become more apparent from the following detailed description taken in conjunction with the accompanying drawings.

BRIEF DESCRIPTION OF THE DRAWINGS

FIG. 5 is a schematic block diagram of a turning state-determining section;

FIGS. 7A to 7E are timing diagrams showing results of respective calculations of a pseudo-integral value S_Dβ, a basic value βb, a vehicle body slip angle β, a comparative value β', and a limit state flag F_SLIP;

FIGS. 9A to 9C are timing diagrams showing the absolute value |β−βact| of the difference between the vehicle body slip angle β and the measured value βact, the absolute value |βb−βact| of the difference between the basic value βb and the measured value βact, and the value of the limit state flag F_SLIP, respectively, which are calculated when the predetermined limit turning traveling state temporarily occurs during turning traveling of the vehicle;

FIG. 10 is a schematic block diagram of another example of the turning state-determining section.

DETAILED DESCRIPTION OF PREFERRED EMBODIMENTS

Figure 1:
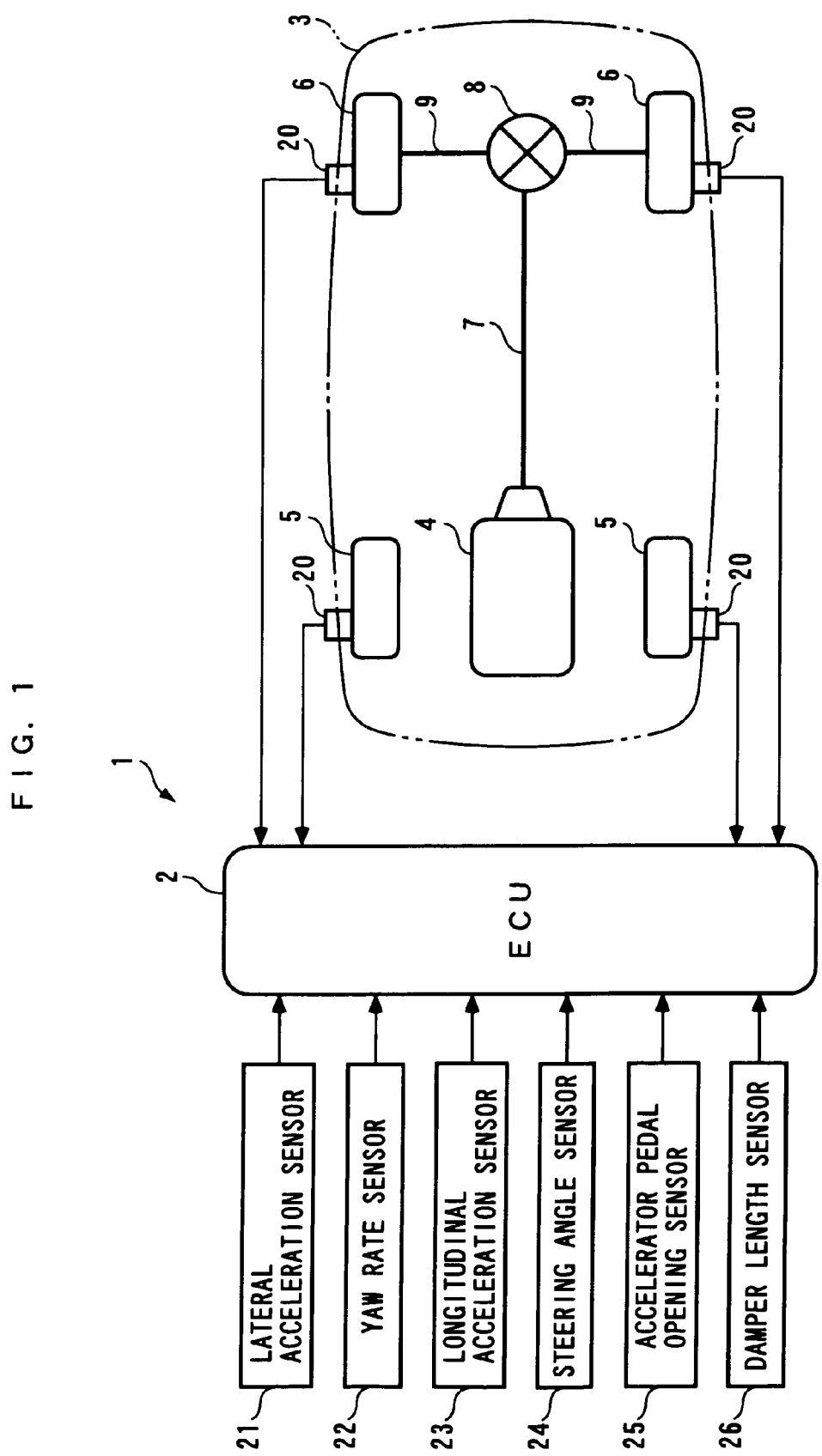
FIG. 1 is a schematic diagram of a vehicle body slip angle-estimating device according to a first embodiment of the present invention, and a vehicle to which is applied the vehicle body slip angle-estimating device.
Figure 2:
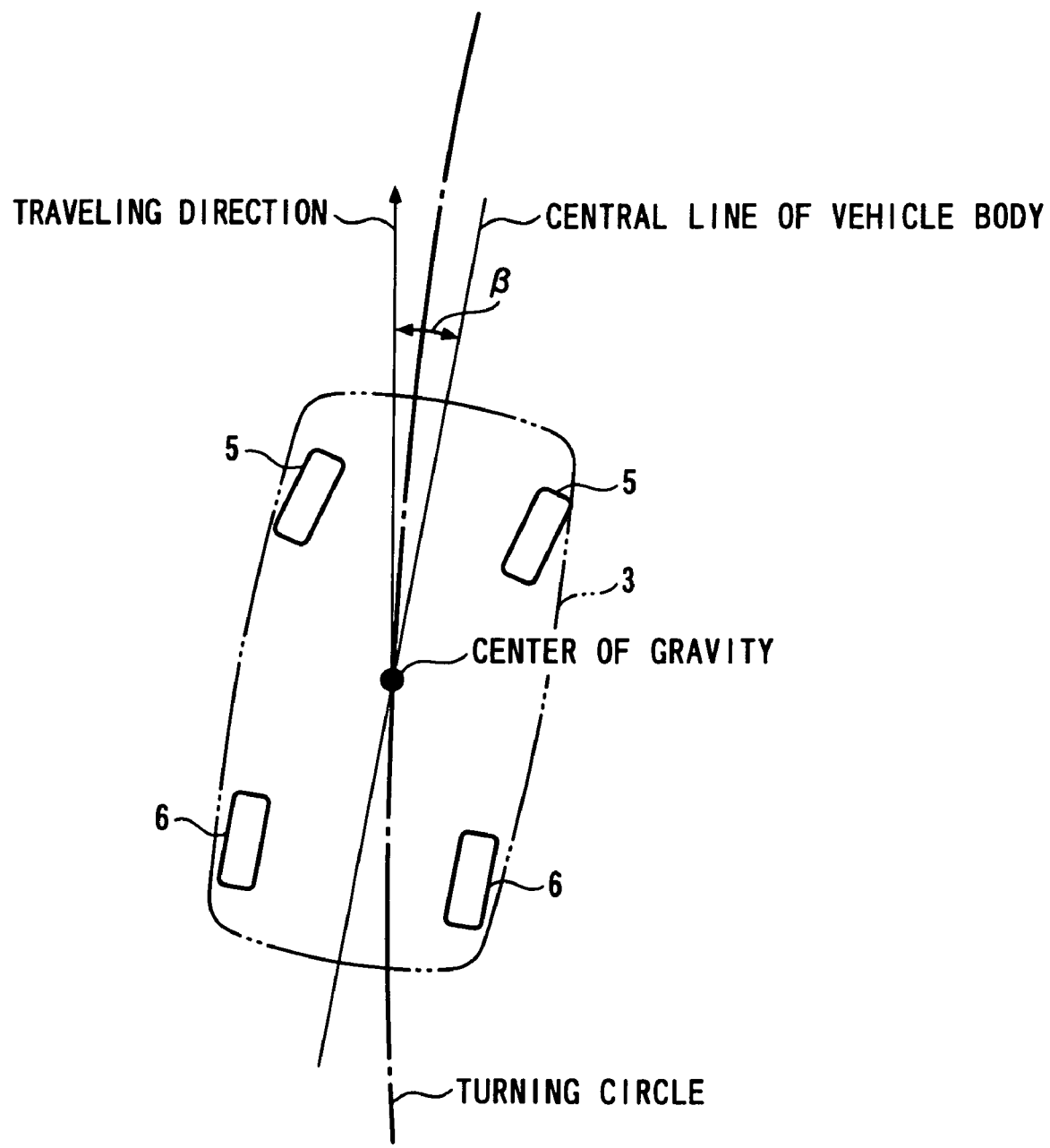
FIG. 2 is a diagram which is useful in explaining a vehicle body slip angle.

Hereafter, a vehicle body slip angle-estimating device according to a first embodiment of the present invention will be described with reference to the drawings. As shown in FIG. 1, the vehicle body slip angle-estimating device 1 according to the present embodiment includes an ECU 2. As described hereinafter, the ECU 2 estimates a vehicle body slip angle β. Referring to FIG. 2, the vehicle body slip angle β represents a relative angle between the central line of the vehicle body and a traveling direction of a vehicle 3 (tangential direction of the turning circle of the vehicle), and positive and negative signs are switched at the left and right corners of the vehicle body.

The vehicle 3 is of an FR (Front-engine Rear-drive) type, and is comprised of an engine 4 installed on a front side of the vehicle, left and right front wheels 5 and 5 as idler wheels, and left and right rear wheels 6 and 6 as drive wheels. In the vehicle 3, the drive force of the engine 4 is transmitted to the left and right rear wheels 6 and 6 via a propeller shaft 7, a differential gear mechanism 8, left and right drive shafts 9 and 9, and so forth.

Further, the vehicle 3 is provided with four wheel speed sensors 20 (vehicle speed-detecting means). Each of the four wheel speed sensors 20 detects the rotational speed of an associated one of the wheels, and delivers a signal indicative of the sensed rotational speed to the ECU 2. The ECU 2 calculates a vehicle speed VP based on the signals from the wheel speed sensors 20. In this case, the vehicle speed VP is calculated as the average value of a drive wheel speed (i.e. an average value of the speeds of the left and right rear wheels) and a non-drive wheel speed (an average value of the speeds of the left and right front wheels).

It should be noted that the vehicle speed VP may be calculated not only by the above-described method but also by another method. For example, an average value of speeds of non-drive wheels may be used as the vehicle speed VP. Further, optical vehicle speed sensors may be employed as the vehicle speed-detecting means in place of the four wheel speed sensors 20.

Furthermore, to the ECU 2 are connected a lateral acceleration sensor 21 (lateral acceleration-detecting means), a yaw rate sensor 22 (yaw rate-detecting means), a longitudinal acceleration sensor 23, a steering angle sensor 24 (steering angle-detecting means), an accelerator pedal opening sensor 25 (accelerator pedal opening-detecting means), and four damper length sensors (only one of which is shown), respectively.

The lateral acceleration sensor 21 detects the lateral acceleration Gy of the vehicle 3, and delivers a signal indicative of the sensed lateral acceleration Gy to the ECU 2. The yaw rate sensor 22 detects the yaw rate γ of the vehicle 3, and delivers a signal indicative of the sensed yaw rate y to the ECU 2. The longitudinal acceleration sensor 23 detects the longitudinal acceleration Gf of the vehicle 3, and delivers a signal indicative of the sensed longitudinal acceleration Gf to the ECU 2. The ECU 2 calculates the lateral acceleration Gy, the yaw rate y, and the longitudinal acceleration Gf based on the signals from the sensors 21 to 23, respectively.

Further, the steering angle sensor 24 detects the steering angle θst of a steering wheel, not shown, of the vehicle 3, and delivers a signal indicative of the sensed steering angle θst to the ECU 2. The accelerator pedal opening sensor 25 detects a stepped-on amount AP of an accelerator pedal, not shown, of the vehicle 3 (hereinafter referred to as "the accelerator pedal opening AP") and delivers a signal indicative of the sensed accelerator pedal opening AP to the ECU 2. Furthermore, the four damper length sensors 26 are implemented e.g. by linear potentiometers, and detect the lengths Damp 1 to 4 of dampers, none of which are specifically shown, of suspensions of the four wheels (hereinafter referred to as "the damper lengths Damp 1 to 4"), to deliver signals indicative of the sensed damper lengths Damp1 to Damp4 to the ECU 2, respectively. The ECU 2 calculates the steering angle θst, the accelerator pedal opening AP, and the damper lengths Damp1 to Damp4 based on the signals from the sensors 24 to 26, respectively.

The ECU 2 is implemented by a microcomputer comprised of a CPU, a RAM, a ROM and an I/O interface (none of which are specifically shown). The ECU 2 estimates the vehicle body slip angle β by a method, described hereinafter, based on the signals from the aforementioned sensors 20 to 26. It should be noted that in the present embodiment, the ECU 2 corresponds to the vehicle speed-detecting means, the lateral acceleration-detecting means, the yaw rate-detecting means, estimated value-calculating means, correction means, determination means, selection means, straight traveling-determining means, and setting means.

Figure 3:
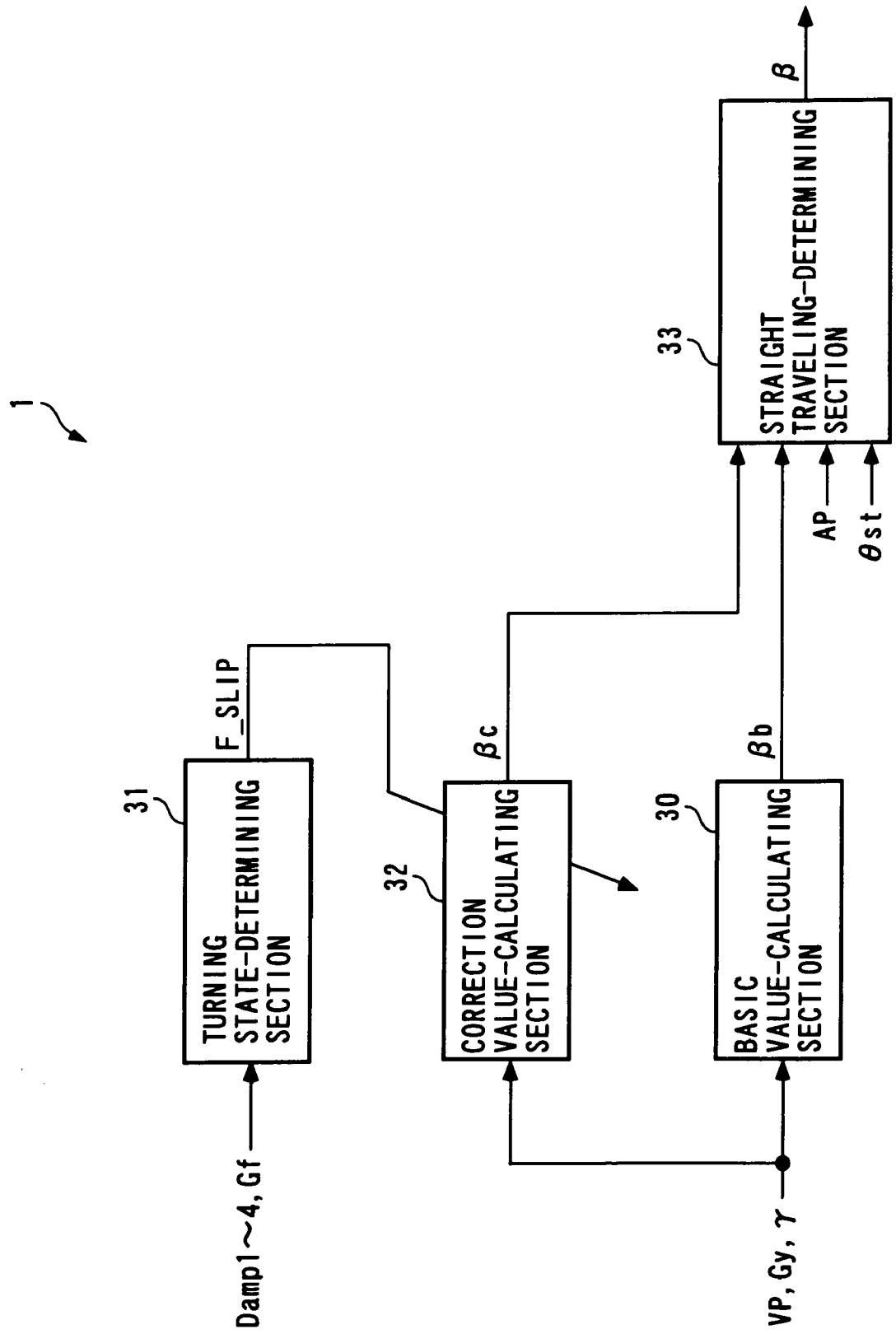
FIG. 3 is a schematic block diagram of the vehicle body slip angle-estimating device.

Next, the vehicle body slip angle-estimating device 1 according to the present embodiment will be described with reference to FIG. 3. As shown in FIG. 3, the vehicle body slip angle-estimating device 1 is comprised of a basic value-calculating section 30, a turning state-determining section 31, a correction value-calculating section 32, and a straight traveling-determining section 33. These component elements 30 to 33 are all implemented by the ECU 2.

Figure 4:
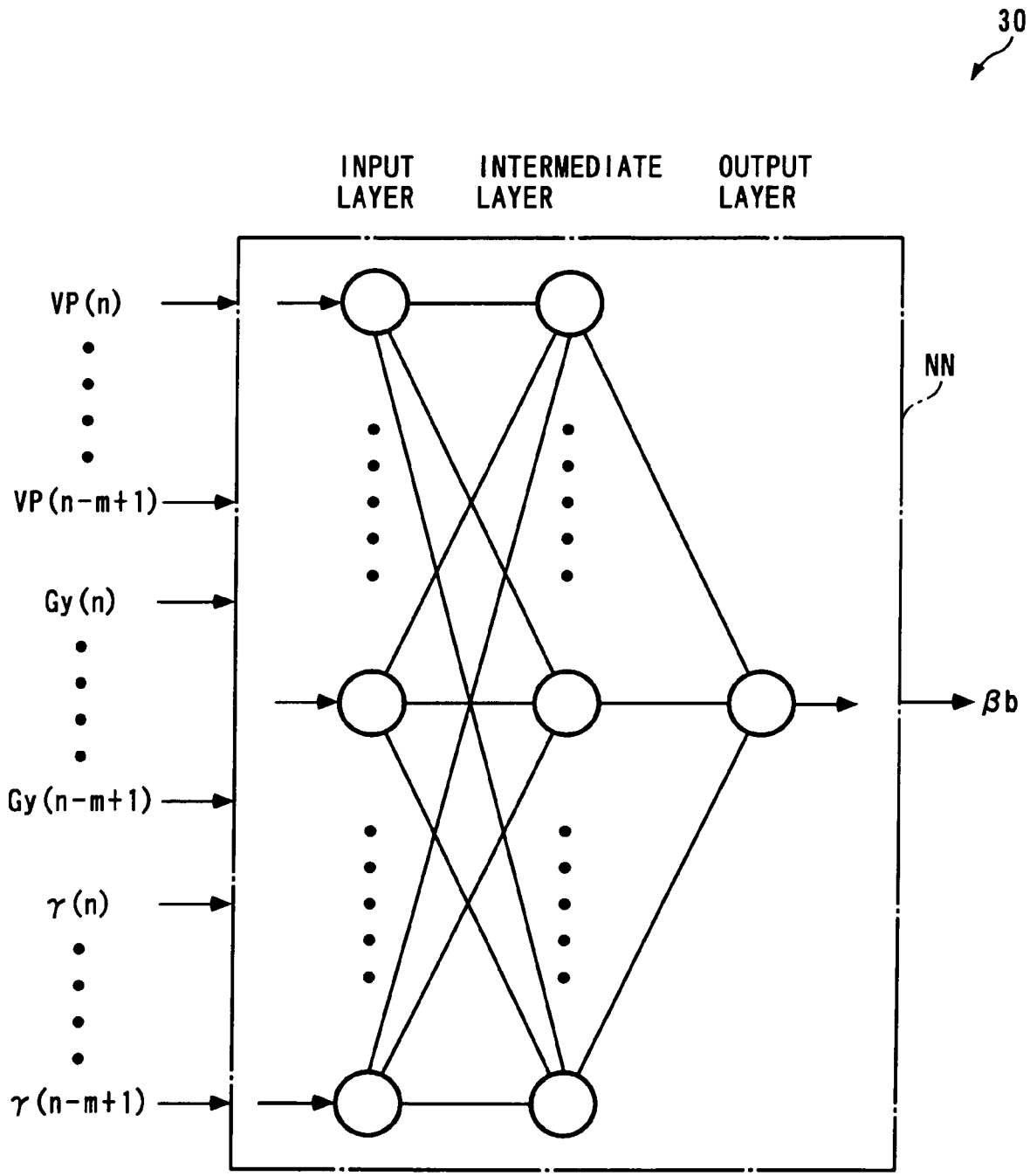
FIG. 4 is a schematic block diagram of a basic value-calculating section.

First, a description will be given of the basic value-calculating section 30 (estimated value-calculating means). As shown in FIG. 4, the basic value-calculating section 30 includes a neural network NN which estimates a basic value βb of the vehicle body slip angle β. More specifically, the basic value βb of the vehicle body slip angle β(estimated value of the vehicle body slip angle) is calculated with an algorithm using a neural network model.

The neural network NN is a three-layered hierarchical neural network which is comprised of an input layer, an intermediate layer, and an output layer. The input layer includes 3m (m is an integer not smaller than 2) neurons (only three of which are shown). The intermediate layer includes J (J is an integer not smaller than 2) neurons (only three of which are shown). The output layer includes a neuron.

It should be noted that in the following description, discrete data with a symbol (n) indicates that it is data calculated or sampled at a predetermined control period ΔTn (e.g. 1 sec). The symbol n indicates a position in the sequence of calculating cycles of respective discrete data. For example, the symbol n indicates that discrete data therewith is a value calculated in the current control timing, and a symbol n−1 indicates that discrete data therewith is a value calculated in the immediately preceding control timing. This also applies to discrete data referred to hereinafter. Further, in the following description, the symbol (n) provided for the discrete data is omitted as deemed appropriate.

To the neural network NN, m values from a value VP(n) calculated in the current control timing to a value VP(n−m+1) calculated in control timing (m−1) times earlier are input as values of the vehicle speed VP. Further, m values from a value Gy(n) to a value Gy(n−m+1) are input as values of the lateral acceleration Gy, and m values from a value γ(n) to a value γ(n−m+1) are input as values of the yaw rate γ It should be noted that in the following description, the inputs VP(n) to VP(n−m+1), Gy(n) to Gy(n−m+1), and γ(n) to γ(n−m+1) are represented by inputs $x1_1$ to $x1_m$, $x1_{m+1}$ to $x1_{2m}$, and $x1_{2m+1}$ to $x1_{3m}$, respectively.

The above inputs $x1_1$ to $x1_{3m}$ are directly input from the 3m neurons of the input layer to each of the J neurons of the intermediate layer. The neurons of the intermediate layer calculate J intermediate outputs $a1_1$ to $a1_j$, respectively, by the following equation (1) each using the inputs $x_1$ to $x1_{3m}$, and then output the intermediate outputs to the neuron of the output layer.

$$a1_j = f_{a1}\left(\sum_{i=1}^{3m} x1_i \cdot w1_{ji} - h1_j\right) \quad (1)$$

wherein $h1_j$ represents a predetermined threshold value, and $w1_{ji}$ represents a weight. As described hereinafter, the values $h1_j$ and $w1_{ji}$ are learned in advance in offline. Further, $f_{a1}$ represents an output function, and a sigmoid function is used as the output function $f_{a1}$, for example.

The neuron of the output layer calculates the basic value βb using the J intermediate outputs $a1_1$ to $a1_j$ input thereto, by the following equation (2):

$$\beta b = f_{r1}\left(\sum_{j=1}^{J} a1_j \cdot v1_j - \theta 1\right) \quad (2)$$

wherein θ1 represents a predetermined threshold value, which is learned in advance in offline, as described hereinafter. Further, $f_{r1}$ represents an output function, and e.g. a sigmoid function is used as the output function $f_{r1}$, similarly to the aforementioned output function $f_{a1}$.

The above threshold values $h1_j$ and θ1, and the weight $w1_{ji}$ are learned by the following method: The three inputs VP, Gy and γ and the output β are actually measured when the vehicle 3 is in a normal turning traveling state, and the threshold values $h1_j$ and θ1, and the weight $w1_{ji}$ are learned in offline using the above measured values by a back propagation method. Now, the term "normal turning traveling state" is intended to mean a turning traveling state in which the absolute value of a vehicle body slip angle, if it is generated, is relatively small to fall within a predetermined range.

As described above, in the basic value-calculating section 30, the basic value βb of the vehicle body slip angle β is calculated by the neural network NN which uses values learned in advance in offline during the normal turning traveling of the vehicle 3, as the threshold values $h1_j$ and θ1, and the weight $w1_{ji}$. That is, the neural network NN calculates the basic value βb of the vehicle body slip angle β using the neural network model of which system identification is performed when the vehicle 3 is in the normal turning traveling state. Therefore, the basic value βb is calculated as a value accurately representing an actual vehicle body slip angle insofar as the vehicle 3 is in the normal turning traveling state.

Next, a description will be given of the aforementioned turning state-determining section 31 (determination means). As described hereinafter, in the turning state-determining section 31, it is determined based on the damper lengths Damp1 to Damp4, the longitudinal acceleration Gf, and the vehicle speeds VP whether the vehicle 3 is in the normal turning traveling state or in a predetermined limit turning traveling state, and based on the result of the determination, the value of a limit state flag F_SLIP is set. Now, the term "predetermined limit turning traveling state" is intended to mean a state in which the vehicle 3 is not in the normal turning traveling state, that is, a state in which a vehicle body slip angle exceeding the above described predetermined range is temporarily generated during turning traveling.

Referring to FIG. 5, the turning state-determining section 31 includes a neural network NN2, a reference value-calculating section 31a, and a flag-setting section 31b.

The neural network NN2 estimates a turning state value βe, which corresponds to the vehicle body slip angle of the vehicle 3 generated during turning traveling. Similarly to the aforementioned neural network NN, the neural network NN2 is a three-layered hierarchical neural network which is comprised of an input layer, an intermediate layer, and an output layer. The input layer includes 5p (p is an integer not smaller than 2) neurons (only three of which are shown). The intermediate layer includes Ja (Ja is an integer not smaller than 2) neurons (only three of which are shown). The output layer includes a neuron.

It should be noted that in the following description, discrete data with a symbol (k) indicates that it is data calculated or sampled at a predetermined control period ΔTk (e.g. 100 msec) shorter than the above-described control period ΔTn. The symbol k indicates a position in the sequence of calculating cycles of respective discrete data. For example, the symbol k indicates that discrete data therewith is a value calculated in the current control timing, and a symbol k−1 indicates that discrete data therewith is a value calculated in the immediately preceding control timing. This also applies to discrete data referred to hereinafter. Further, in the following description, the symbol (k) provided for the discrete data is omitted as deemed appropriate.

To the neural network NN2, p values of each of respective ranges from Damp1(k) to Damp4(k) calculated in the current control timing to Damp1(k−p+1) to Damp4(k−p+1) calculated in control timing (p-1) times earlier are input as the damper length values Damp1 to Damp4. Further, p values from a value Gf(k) calculated in the current control timing to a value Gf(k−p+1) calculated in the control timing (p−1) times earlier are input to the neural network NN2 as the longitudinal acceleration Gf, respectively.

It should be noted that in the following description, inputs Damp1(k) to Damp1(k−p+1) are represented by inputs $x2_1$ to $x2_p$, respectively; inputs Damp2(k) to Damp2(k−p+1) are represented by inputs $x2_{p+1}$ to $x2_{2p}$, respectively; inputs Damp3(k) to Damp3(k−p+1) are represented by inputs $x2_{2p+1}$ to $x2_{3p}$; inputs Damp4(k) to Damp4(k−p+1) are represented by inputs $x2_{3p+1}$ to $x2_{4p}$; and inputs Gf(k) to Gf(k−p+1) are represented by inputs $x2_{4p+1}$ to $x2_{5p}$.

The above inputs $x2_1$ to $x2_{5p}$ are directly input from the 5p neurons of the input layer to each of the Ja neurons of the intermediate layer. The neurons of the intermediate layer calculate Ja intermediate outputs $a2_1$ to $a2_{ja}$, respectively, by the following equation (3) each using the inputs $x2_1$ to $x2_{5p}$, and then output the intermediate outputs to the neuron of the output layer.

$$a2_j = f_{a2}\left(\sum_{i=1}^{5p} x2_i \cdot w2_{ji} - h2_j\right) \quad (3)$$

wherein $h2_j$ represents a predetermined threshold value, and $w2_{ji}$ represents a weight. As described hereinafter, the values $h2_j$ and $w2_{ji}$ are learned in advance in offline. Further, $f_{a2}$ represents an output function, and a sigmoid function is used as the output function $f_{a2}$, for example.

The neuron of the output layer calculates the turning state value βe using the Ja intermediate outputs $a2_1$ to $a2_{ja}$ input thereto, by the following equation (4):

$$\beta e = f_{r2}\left(\sum_{j=1}^{Ja} a2_j \cdot v2_j - \theta 2\right) \quad (4)$$

wherein θ2 represents a predetermined threshold value, which is learned in advance in offline, as described hereinafter. Further, $f_{r2}$ represents an output function, and e.g. a sigmoid function is used as the output function $f_{r2}$, similarly to the aforementioned output function $f_{a2}$.

The above threshold values $h2_j$ and θ2, and the weight $w2_{ji}$ are learned by the following method: The five inputs of Damp 1 to Damp4 and Gf, and the output βe are actually measured when the vehicle 3 is in the predetermined limit turning traveling state, and threshold values $h2_j$ and θ2, and the weight $w2_{ji}$ are learned in offline using the above measured values by a back propagation method.

Figure 6:
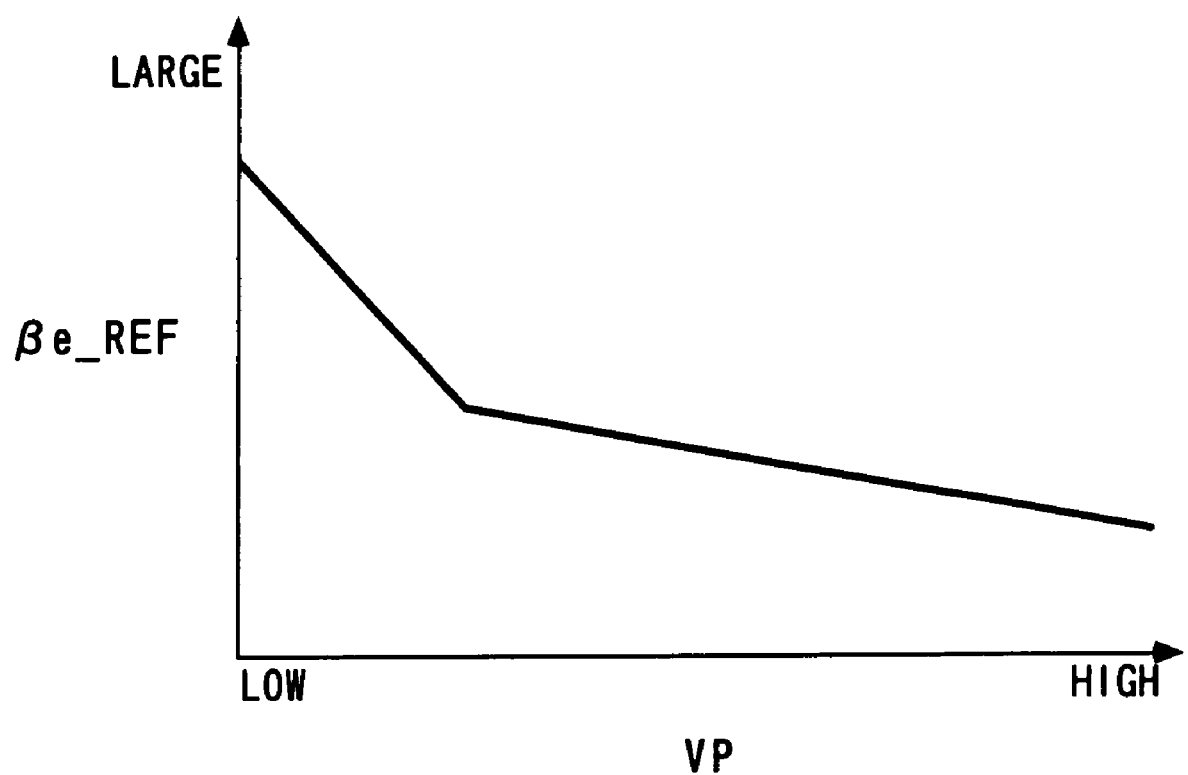
FIG. 6 is a diagram showing an example of a map for use in calculating a reference value βe_REF.

On the other hand, the aforementioned reference value-calculating section 31a calculates a reference value βe_REF by searching a map shown in FIG. 6 according to the vehicle speed VP. In this map, the reference value βe_REF is set to a smaller value as the vehicle speed VP is higher. This is because as the vehicle speed VP is higher, the vehicle 3 is more likely to be placed in the limit turning traveling state in which the vehicle body is liable to spin even if the vehicle body slip angle is small.

Then, the flag-setting section 31b determines whether or not the vehicle 3 is in the predetermined limit turning traveling state, by comparing the turning state value βe calculated as above and the predetermined reference value βe_REF with each other, and sets the value of the limit state flag F_SLIP based on the result of the determination.

More specifically, when the absolute value |βe| of the turning state value is not smaller than the predetermined reference value βe_REF, it is determined that the vehicle 3 is in the predetermined limit turning traveling state, and to indicate the fact, the limit state flag F_SLIP is set to 1. On the other hand, when |βe|<βe_REF holds, it is determined that the vehicle 3 is in the normal turning traveling state, and to indicate the fact, the limit state flag F_SLIP is set to 0.

Next, a description will be given of the aforementioned correction value-calculating section 32 (correction means, selection means). As described hereinafter, the correction value-calculating section 32 calculates a correction value βc based on the value of the above-described limit state flag F_SLIP. It should be noted that the correction value-calculating section 32 calculates the correction value βc at the above-described calculation period ΔTn longer than the calculation period ΔTk of the limit state flag F_SLIP, and hence, as the value of the limit state flag F_SLIP, there is used a down-sampled value thereof.

More specifically, when F_SLIP=1 holds, i.e. when the vehicle 3 is in the predetermined limit turning traveling state, the correction value βc is calculated by the following equations (5) to (7) to which a pseudo-integration method is applied.

$$D\beta(n) = \frac{Gy(n)}{VP(n)} - \gamma(n) \quad (5)$$

$$S\_D\beta(n) = S\_D\beta(n-1) + \Delta Tn \cdot D\beta(n) \quad (6)$$

$$\beta c(n) = Kc \cdot S\_D\beta(n) \quad (7)$$

wherein Dβ represents the velocity of the vehicle body slip angle, S_Dβ represents a pseudo-integral value of the velocity of the vehicle body slip angle, and Kc represents a predetermined gain. It should be noted that the initial value of the pseudo-integral value S_Dβ is set to 0. More specifically, the pseudo-integral value S_Dβ starts to be calculated when the normal turning traveling state is shifted to the predetermined limit turning traveling state, and necessarily assumes a value of 0 when it starts to be calculated. Further, the predetermined gain Kc is set to an appropriate fixed value in advance in offline such that a value (i.e. the vehicle body slip angle β) obtained by adding the correction value βc to the basic value βb becomes equal to the value of the vehicle body slip angle actually measured when the vehicle 3 is in the predetermined limit turning traveling state.

On the other hand, when F_SLIP=0 holds, i.e. when the vehicle 3 is in the normal turning traveling state, the correction value βc is calculated by the following equation (8):

$$\beta c(n) = 0 \tag{8}$$

As described above, the correction value-calculating section 32 calculates the correction value βc by the method to which is applied the pseudo-integration method, when the vehicle 3 is in the predetermined limit turning traveling state, and sets the correction value βc to 0 when the vehicle 3 is in the normal turning traveling state.

It should be noted that the aforementioned equation (5) is derived by rewriting the equation of motion of a continuous-time system shown in the following equation (9) into a discrete-time system equation.

$$\dot{\beta} = \frac{Gy}{VP} - \gamma \tag{9}$$

Then, the straight traveling-determining section 33 (correction means, straight traveling-determining means, and setting means) determines whether or not the vehicle 3 is in the straight traveling state, by comparing the accelerator pedal opening AP and the steering angle θst with predetermined reference values AP_REF and θst_REF, respectively, and calculates the vehicle body slip angle β based on the results of the determination.

More specifically, when AP≦AP_REF or θst≧θst_REF holds, it is determined that the vehicle 3 is in the turning traveling state, and the vehicle body slip angle β is calculated by the following equation (10):

$$\beta(n) = \beta b(n) + \beta c(n) \tag{10}$$

On the other hand, when AP>AP_REF and at the same time θst<θst_REF holds, it is determined that the vehicle 3 is in the straight traveling state, and the vehicle body slip angle β is calculated by the following equation (11).

$$\beta(n) = 0 \tag{11}$$

As described above, the straight traveling-determining section 33 sets the vehicle body slip angle β to 0 when the vehicle 3 is in the straight traveling state, and sets the same to the sum of the basic value βb and the correction value βc when the vehicle 3 is in the turning traveling state. In this case, as described hereinabove, when the vehicle 3 is in the normal turning traveling state, βc=0 holds, and hence β=βb holds, whereas when the vehicle 3 is in the predetermined limit turning traveling state, β=βb+βc holds.

Next, a description will be given of the reason why the above-described method for calculating the vehicle body slip angle β is employed in the vehicle body slip angle-estimating device 1 according to the present embodiment. FIGS. 7A to 7E show the results of calculation of various values of the vehicle body slip angle β, performed when the vehicle 3 is in the turning traveling state. FIG. 7A shows the result of calculation of the aforementioned pseudo-integral value S_Dβ. FIG. 7B shows the result of calculation of the basic value βb.

FIG. 7C shows the result of calculation of the vehicle body slip angle β by the calculation method according to the present embodiment.

Further, a value β' appearing in FIG. 7D represents a comparative value of the vehicle body slip angle, which is calculated assuming that β'=S_Dβ when the limit state flag F_SLIP=0 holds which means that the vehicle 3 is in the normal turning traveling state, and is calculated assuming that β'=βb when F_SLIP=1 holds which means that the vehicle 3 is in the predetermined limit turning traveling state. In other words, the comparative value β' corresponds to a value of the vehicle body slip angle which is calculated only by the pseudo-integration method when the vehicle 3 is in the normal turning traveling state, and a value thereof which is calculated by the method using the neural network NN to which the pseudo-integration method is switched when the vehicle 3 is in the predetermined limit turning traveling state. Furthermore, FIG. 7E shows the value of the limit state flag F_SLIP.

As is clear from the comparison between FIG. 7A and FIG. 7B, if the vehicle 3 is in the predetermined limit turning traveling state and the limit state flag F_SLIP=1 holds at a time point t1, the pseudo-integral value S_Dβ starts to be calculated, whereafter the pseudo-integral value S_Dβ is sharply increased. In contrast, the basic value βb is progressively increased with a small amount of change. That is, when the neural network NN is used, the calculation accuracy, i.e. the estimation accuracy of the vehicle body slip angle β is degraded compared with the case in which the pseudo-integration is used. This is because when the neural network NN is used, the aforementioned weights and threshold values are learned based on values thereof which are generated with higher frequency, and hence the learning accuracy of the weights and threshold values is degraded under a condition where values thereof are generated with a low frequency, as in the case where the vehicle 3 is in the predetermined limit turning traveling state.

On the other hand, as is clear from FIG. 7D, when the method of calculating the comparative value β' is switched between the pseudo-integration and the method using the neural network NN according to the value of the limit state flag F_SLIP, the comparative value β' becomes discontinuous in timing in which the calculation method is switched (time points t1 and t2), forming a step. In contrast, the vehicle body slip angle β by the calculation method according to the present embodiment is calculated almost steplessly when the value of the limit state flag F_SLIP is changed between 1 and 0, i.e. even when the turning traveling state of the vehicle 3 is switched between the normal turning traveling state and the predetermined limit turning traveling state. Therefore, it is understood that the calculation accuracy, i.e. the estimation accuracy of the vehicle body slip angle β is enhanced compared with that of the comparative value β'.

As described above, according to the present embodiment, the vehicle body slip angle β is calculated by the above-described calculation method so as to prevent the calculated values of the vehicle body slip angle β from becoming discontinuous even in timing in which the turning traveling state of the vehicle 3 is switched between the normal turning traveling state and the predetermined limit turning traveling state, to thereby enhance the calculation accuracy of the vehicle body slip angle β.

Figure 8A:
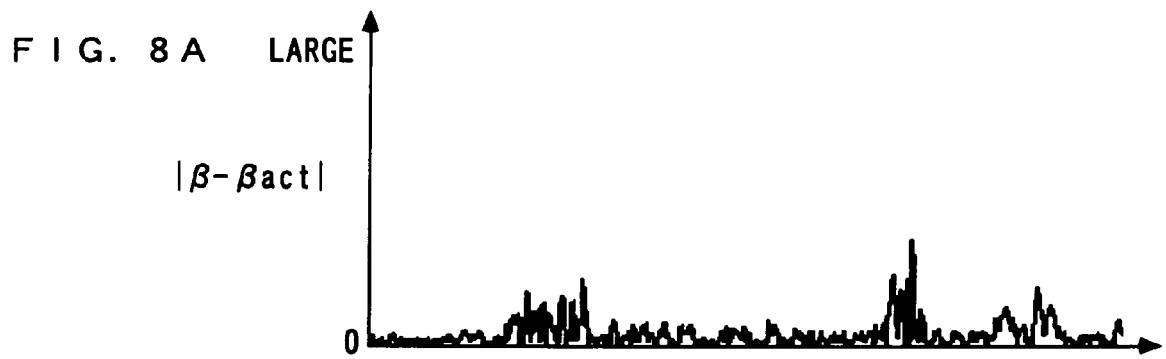
FIGS. 8A to 8C are timing diagrams showing the absolute value |β−βact| of the difference between the vehicle body slip angle β and a measured value βact, the absolute value |βb−βact| of the difference between the basic value βb and the measured value βact, and a value of the limit state flag F_SLIP, respectively, which are calculated when the vehicle travels only in a normal turning traveling state during turning traveling of the vehicle.
Figure 8B:
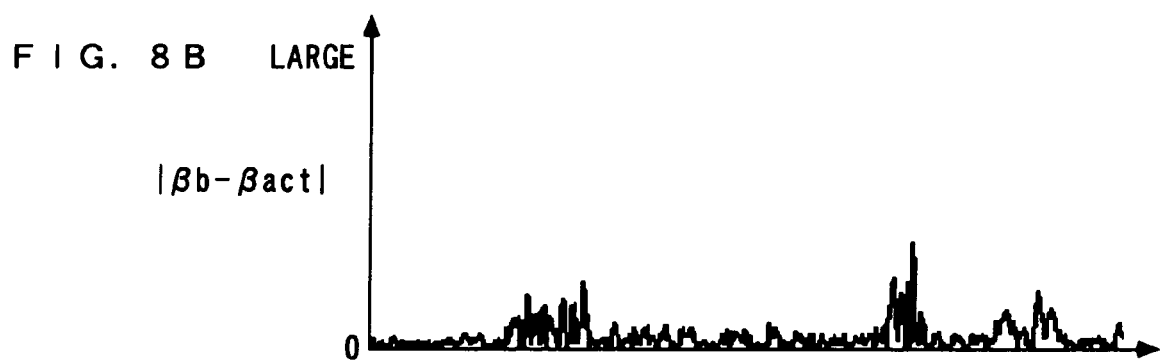
Figure 8C:

Next, the results of comparison between the vehicle body slip angle β, which is calculated during turning traveling of the vehicle 3 by the calculation method according to the present embodiment, and a measured value βact of the vehicle body slip angle will be described with reference to FIGS. 8A to 8C and FIGS. 9A to 9C. FIGS. 8A to 8C show the results of the comparison between the calculated value and the measured value obtained when the vehicle 3 travels only in the normal turning traveling state. FIGS. 9A to 9C show the results of the comparison between the same obtained when the predetermined limit turning traveling state temporarily occurs (time points t10 and t11).

More specifically, FIGS. 8A and 9A show the absolute value |β−βact| of the difference between the vehicle body slip angle β and the measured value βact. FIGS. 8B and 9B show the absolute value |βb−βact| of the difference between the basic value βb and the measured value βact, for comparison with FIGS. 8A and 9A.

As is clear from FIGS. 8A to 8C, when the vehicle 3 travels only in the normal turning traveling state, βc=0 comes to hold, and hence β=βb holds, whereby |β−βact|=βb−βact| holds. Consequently, it is understood that even when the vehicle body slip angle β is calculated only by the neural network NN, high calculation accuracy can be ensured insofar as the vehicle 3 is in the normal turning traveling state.

On the other hand, as is clear from FIGS. 9A to 9C, when the turning traveling state of the vehicle 3 is shifted from the normal turning traveling state to the predetermined limit turning traveling state at the time point t10, the degree of increase in the difference |βb−βact| becomes considerably larger than the degree of increase in the difference |β−βact|. That is, it is understood that by using the correction value βc according to the present embodiment, the vehicle body slip angle β is calculated as a value closer to the measured value βact than the basic value βb, and the calculation accuracy of the vehicle body slip angle β is enhanced.

As described above, according to the vehicle body slip angle-estimating device 1 of the present embodiment, the basic value-calculating section 30 calculates the basic value βb of the vehicle body slip angle β by using the neural network NN, and the straight traveling-determining section 33 sets the vehicle body slip angle β to the sum of the basic value βb and the correction value βc when the vehicle 3 is in the turning traveling state. The correction value βc is set to 0 by the correction value-calculating section 32 when the vehicle 3 is in the normal turning traveling state (when F_SLIP=0 holds), so that in this case, β=βb+βc=βb holds. Here, since the threshold values $h1_j$ and $θ1$, and the weight $w1_{ji}$, which are learned when the vehicle 3 is in the normal turning traveling state, are used in the neural network NN, the basic value βb is calculated such that it represents an actual vehicle body slip angle accurately insofar as the vehicle 3 is in the normal turning traveling state. Therefore, when the vehicle 3 is in the normal turning traveling state, i.e. in a state of turning traveling of the vehicle which occurs with a high frequency, it is possible to accurately calculate the vehicle body slip angle β.

On the other hand, when the vehicle 3 is in the predetermined limit turning traveling state (when F_SLIP=1 holds), the correction value βc is calculated as a value obtained by multiplying the pseudo-integral value S_Dβ calculated by the pseudo-integration method by a predetermined gain Kc. The predetermined gain Kc is set to an appropriate fixed value in advance in offline such that a value, which is obtained by adding the correction value βc to the basic value βb, i.e. the vehicle body slip angle β becomes equal to the value of the vehicle body slip angle actually measured when the vehicle 3 is in the predetermined limit turning traveling state. In addition, it is generally known that when the pseudo-integration method is used, the robustness with respect to a change in a road surface μ is higher than when the neural network model is used. For this reason, if the vehicle body slip angle β is calculated by correcting the basic value βb by the correction value βc, when the vehicle β is in the predetermined limit turning traveling state, i.e. even in a turning traveling state which occurs with a low frequency, the vehicle body slip angle β can be calculated more accurately than when the vehicle body slip angle β is calculated only by the neural network NN.

Therefore, according to the vehicle body slip angle-estimating device 1 of the present embodiment, the vehicle body slip angle β can be estimated with high accuracy irrespective of whether the vehicle 3 is in the normal turning traveling state or in the predetermined limit turning traveling state, in other words, irrespective of the frequency of occurrence of the turning traveling state of the vehicle 3. Further, the vehicle body slip angle-estimating device 1 configured as above can be realized by using the neural network model and the pseudo-integration method.

In addition, when the vehicle 3 is in the straight traveling state, the vehicle body slip angle β is set to 0. This makes it possible to prevent the value of the vehicle body slip angle β of the vehicle 3 in the straight traveling state from being reflected on the basic value βb of the vehicle body slip angle, thereby making it possible to further enhance the estimation accuracy of the vehicle body slip angle β.

Furthermore, in determining whether or not the vehicle 3 is in the straight traveling state, by combining the result of comparison between the accelerator pedal opening AP and the predetermined reference value AP_REF thereof with the result of comparison between the steering angle θst and the predetermined reference value θst_REF thereof, it is possible to relatively accurately perform the determination. Therefore, according to the vehicle body slip angle-estimating device 1 of the present embodiment, by using the above method, it is possible to accurately determine whether or not the vehicle 3 is in the straight traveling state, thereby making it possible to further enhance the estimation accuracy of the vehicle body slip angle β.

It should be noted that although in the first embodiment, the neural network model indicative of the relationship between the vehicle speed, the lateral acceleration, the yaw rate, and the vehicle body slip angle is used as a predetermined nonlinear model, by way of example, the nonlinear model according to the present invention is not limited to this, but any suitable nonlinear model may be used insofar as it represents at least the relationship between the vehicle speed, the lateral acceleration, the yaw rate, and the vehicle body slip angle. For example, as the nonlinear model, there may be used a neural network model which represents the relationship between not only the vehicle speed, the lateral acceleration, the yaw rate, and the vehicle body slip angle but also another parameter, such as the steering angle. Further, as the nonlinear model, there may be used e.g. a nonlinear two-degree-of-freedom model which represents the relationship between the cornering forces of the front and rear wheels, the vehicle speed, the lateral acceleration, the yaw rate, the vehicle body slip angle, and the distances from the center of gravity of the vehicle to the front and rear axles of the vehicle.

Further, although in the first embodiment, the back propagation method is used as the method of learning the weights $w1_{ji}$ and $w2_{ji}$ and the threshold values $h1_j$, $θ1$, and $h2_j$, and $θ_2$ of the neural networks NN and NN2, by way of example, the method of learning the weights and threshold values of the neural network according to the present invention is not limited to this, but any other suitable method, such as a random searching method, may be used.

Furthermore, although in the first embodiment, neural networks provided with both weights and threshold values are used as the neural networks NN and NN2, i.e. as the neural network models, by way of example, this is not limitative, but neural networks configured to have no threshold values may be used as the neural network models.

In addition, although in the first embodiment, the equation (9) is used as the predetermined linear model, by way of example, the linear model according to the present invention is not limited to this, but any suitable linear model may be used insofar as it represents at least the relationship between the vehicle speed, the lateral acceleration, the yaw rate, and the vehicle body slip angle.

Further, although in the first embodiment, the turning state-determining section 31 is used as the determination means, by way of example, the determination means according to the present invention is not limited to this, but any suitable determination means may be used insofar as it is capable of determining whether or not the vehicle is in a predetermined turning traveling state (i.e. the predetermined limit turning traveling state). For example, a turning state-determining section 40 shown in FIG. 10 may be used as the determination means.

As described hereinafter, the turning state-determining section 40 determines whether or not the vehicle 3 is in the predetermined limit turning traveling state, based on the vehicle speed VP, the lateral acceleration Gy, and the yaw rate γ, and sets the value of the limit state flag F_SLIP based on the result of the determination. As shown in FIG. 10, the turning state-determining section 40 includes a neural network NN3 and a flag-setting section 41.

As described hereinafter, the neural network NN3 calculates an estimated yaw rate γhat which is an estimated value of the yaw rate γ. Similarly to the aforementioned neural network NN2, the neural network NN3 is a three-layered hierarchical neural network which is comprised of an input layer, an intermediate layer, and an output layer. The input layer includes 3p (p is an integer not smaller than 2) neurons (only three of which are shown). The intermediate layer includes Jb (Jb is an integer not smaller than 2) neurons (only three of which are shown). The output layer includes a neuron.

To the neural network NN3, p values from a value VP(k) calculated in the current control timing to a value VP(k−p+1) calculated in control timing (p−1) times earlier are input as values of the vehicle speed VP. Further, p values from a value Gy(k) to a value Gy(k−p+1) are input as values of the lateral acceleration Gy, and p values from a value θst(k) to a value θst(k−p+1) are input as values of the steering angle θst. It should be noted that in the following description, the inputs VP(k) to VP(k−p+1), Gy(k) to Gy(k−p+1), and θst(k) to θst(k−p+1) are represented by inputs $x3_1$ to $x3_p$, $x3_{p+1}$ to $x3_{2p}$, and $x3_{2p+1}$ to $x3_{3p}$, respectively.

The above inputs $x3_1$ to $x3_{3p}$ are directly input from the 3p neurons of the input layer to each of the Jb neurons of the intermediate layer. The neurons of the intermediate layer calculate Jb intermediate outputs $a3_1$ to $a3_{jb}$, respectively, by the following equation (12) each using the inputs $x3_1$ to $x3_{3p}$, and then output the respective intermediate outputs to the neuron of the output layer.

$$a3_j = f_{a3}\left(\sum_{i=1}^{3p} x3_i \cdot w3_{ji} - h3_j\right) \quad (12)$$

wherein $h3_j$ represents a predetermined threshold value, and $w3_{ji}$ represents a weight. As described hereinafter, the values $h3_j$ and $w3_{ji}$ are learned in advance in offline. Further, $f_{a3}$ represents an output function, and a sigmoid function is used as the output function $f_{a3}$, for example.

The neuron of the output layer calculates the estimated yaw rate γhat using the Jb intermediate outputs $a3_1$ to $a3_{jb}$ input thereto, by the following equation (13):

$$\gamma hat = f_{r3}\left(\sum_{j=1}^{Jb} a3_j \cdot v3_j - \theta 3\right) \quad (13)$$

wherein θ3 represents a predetermined threshold value, which is learned in advance in offline, as described hereinafter. Further, $f_{r4}$ represents an output function, and e.g. a sigmoid function is used as the output function $f_{r4}$, similarly to the aforementioned output function $f_{a3}$.

The above-described threshold values $h3_j$ and θ3, and the weight $w3_{ji}$ are learned by the following method: The three inputs VP, Gy and θst, and the output γ are actually measured when the vehicle 3 is in the predetermined limit turning traveling state, and the threshold values $h3_j$ and θ3, and the weight $w3_{ji}$ are learned in offline using the above measured values by the back propagation method.

The flag-setting section 41 sets the value of the limit state flag F_SLIP by comparing the absolute value |γhat(k)−γ(k)| of the difference between the estimated value γhat(k) calculated as above and the current value γ(k) of the yaw rate, and a predetermined reference value γ_REF.

More specifically, when |γhat(k)−γ(k)|≧γ_REF holds, it is determined that the vehicle 3 is in the predetermined limit turning traveling state, and to indicate the fact, the limit state flag F_SLIP is set to 1. On the other hand, when |γhat(k)−γ(k)|<γ_REF holds, it is determined that the vehicle 3 is in the normal turning traveling state, and to indicate the fact, the limit state flag F_SLIP is set to 0.

Next, a vehicle body slip angle-estimating device 1A according to a second embodiment will be described with reference to FIG. 11. Although not shown, the hardware of the vehicle body slip angle-estimating device 1A is configured similarly to that of the above-described vehicle body slip angle-estimating device 1 according to the first embodiment, and hence component elements of the vehicle body slip angle-estimating device 1A, identical to those of the vehicle body slip angle-estimating device 1, are designated by identical reference numerals, and detailed description thereof is omitted.

Figure 11:
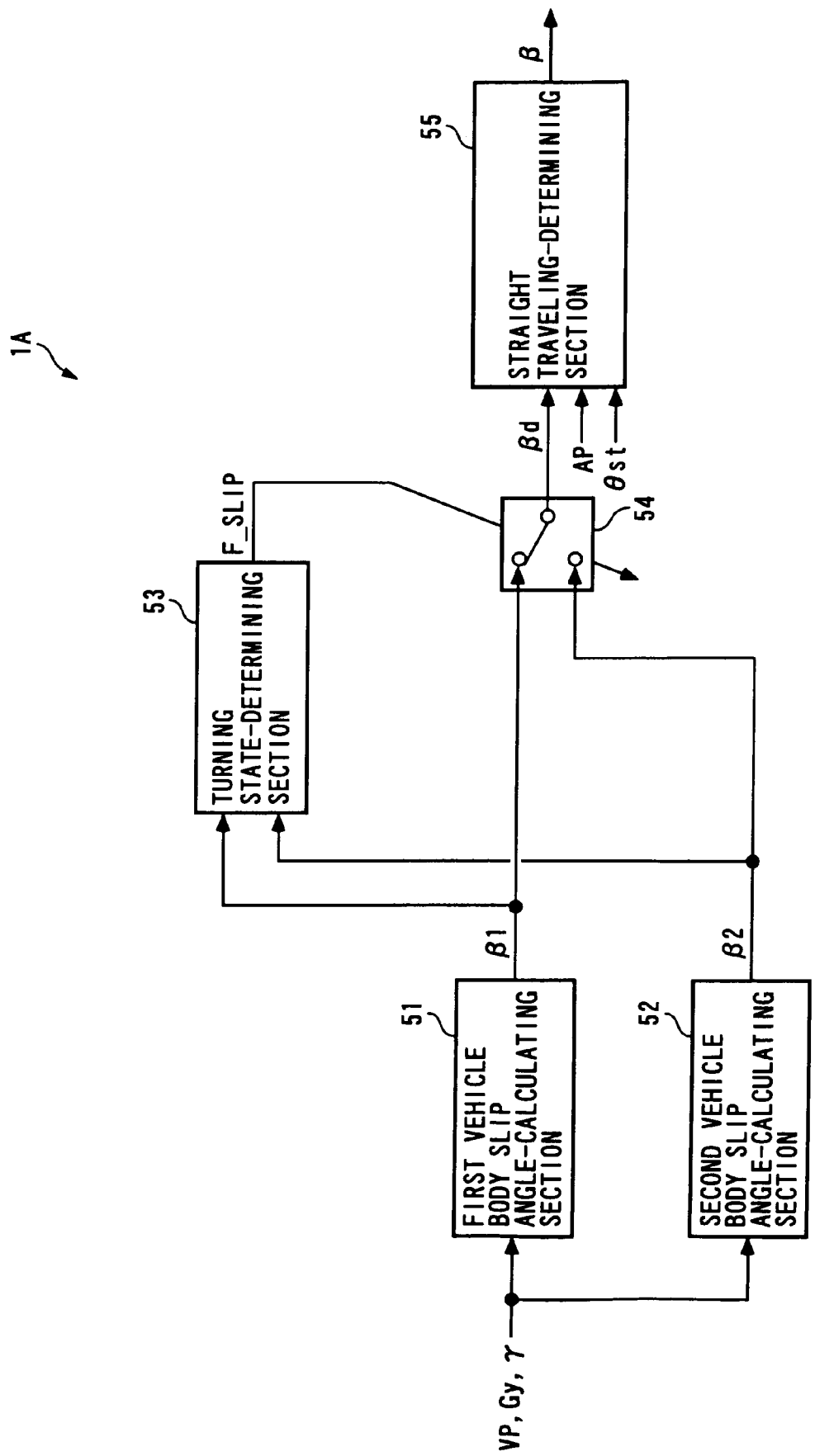
FIG. 11 is a schematic block diagram of a vehicle body slip angle-estimating device according to a second embodiment of the present invention.

As shown in FIG. 11, the vehicle body slip angle-estimating device 1A is comprised of a first vehicle body slip angle-calculating section 51, a second vehicle body slip angle-calculating section 52, a turning state-determining section 53, a selection section 54, and a straight traveling-determining section 55. These component elements 51 to 55 are all implemented by the ECU 2.

It should be noted that in the present embodiment, the ECU 2 corresponds to the vehicle speed-detecting means, the lateral acceleration-detecting means, the yaw rate-detecting means, first estimation means, second estimation means, determination means, selection means, straight traveling-determining means, and setting means.

First, a description will be given of the first vehicle body slip angle-calculating section 51 (first estimation means). The first vehicle body slip angle-calculating section 51 includes a first neural network, not shown, and calculates a first vehicle body slip angle β1 as the estimated value of the vehicle body slip angle β by the first neural network.

Similarly to the aforementioned neural network NN, the first neural network is a three-layered hierarchical neural network which is comprised of an input layer, an intermediate layer, and an output layer. The input layer includes 3m neurons, not shown. The intermediate layer includes J neurons, not shown. The output layer includes a neuron, not shown.

To the first neural network, m values from a value VP(n) calculated in the current control timing to a value VP(n−m+1) calculated in control timing (m−1) times earlier are input as values of the vehicle speed VP. Further, m values from a value Gy(n) to a value Gy(n−m+1) are input as values of the lateral acceleration Gy, and m values from a value γ(n) to a value γ(n−m+1) are input as values of the yaw rate γ. It should be noted that in the following description, the inputs VP(n) to VP(n−m+1), Gy(n) to Gy(n−m+1), and γ(n) to γ(n−m+1), which are input to the first neural network, are represented by inputs $x4_1$ to $x4_m$, $x4_{m+1}$ to $x4_{2m}$, and $x4_{2m+1}$ to $x4_{3m}$, respectively.

The above inputs $x4_1$ to $x4_{3m}$ are directly input from the 3m neurons of the input layer to each of the J neurons of the intermediate layer. The neurons of the intermediate layer calculate J intermediate outputs $a4_1$ to $a4_j$, respectively, by the following equation (14) each using the inputs $x4_1$ to $x4_{3m}$ and then output the respective intermediate outputs to the neuron of the output layer.

$$a4_j = f_{a4}\left(\sum_{i=1}^{3m} x4_i \cdot w4_{ji} - h4_j\right) \quad (14)$$

wherein $h4_j$ represents a predetermined threshold value, and $w4_{ji}$ represents a weight. As described hereinafter, the values $h4_j$ and $w4_{ji}$ are learned in advance in offline. Further, $f_{a4}$ represents an output function, and a sigmoid function is used as the output function $f_{a4}$, for example.

The neuron of the output layer calculates the first vehicle body slip angle β1 using the J intermediate outputs $a4_1$ to $a4_j$ input thereto, by the following equation (15):

$$\beta1 = f_{r4}\left(\sum_{j=1}^{J} a4_j \cdot v4_j - \theta4\right) \quad (15)$$

wherein θ4 represents a predetermined threshold value, which is learned in advance in offline, as described hereinafter. Further, $f_{r4}$ represents an output function, and e.g. a sigmoid function is used as the output function $f_{r4}$, similarly to the aforementioned output function $f_{a4}$.

The above threshold values $h4_j$ and θ4, and the weight $w4_{ji}$ are learned by the following method: The three inputs VP, Gy and γ and the output β are actually measured when the vehicle 3 is in the normal turning traveling state, and the threshold values $h4_j$ and θ4, and the weight $w4_{ji}$ are learned in offline using the above measured values by the back propagation method.

As described above, in the first vehicle body slip angle-calculating section 51, the first neural network calculates the first vehicle body slip angle β1, and uses values learned in advance in offline during the normal turning traveling of the vehicle 3, as the threshold values $h4_j$ and θ4, and the weight $w4_{ji}$. That is, the first neural network calculates the first vehicle body slip angle β1 using the neural network model of which system identification is performed when the vehicle 3 is in the normal turning traveling state. Therefore, the first vehicle body slip angle β1 is calculated as a value accurately representing an actual vehicle body slip angle insofar as the vehicle 3 is in the normal turning traveling state.

Next, a description will be given of the second vehicle body slip angle-calculating section 52 (second estimation means). The second vehicle body slip angle-calculating section 52 includes a second neural network, not shown, and calculates a second vehicle body slip angle β2 as the estimated value of the vehicle body slip angle β by the second neural network.

Similarly to the aforementioned neural network NN, the second neural network is a three-layered hierarchical neural network which is comprised of an input layer, an intermediate layer, and an output layer. The input layer includes 3m neurons, not shown. The intermediate layer includes J neurons, not shown. The output layer includes a neuron, not shown.

To the second neural network, m values from a value VP(n) calculated in the current control timing to a value VP(n−m+1) calculated in control timing (m−1) times earlier are input as values of the vehicle speed VP. Further, m values from a value Gy(n) to a value Gy(n−m+1) are input as values of the lateral acceleration Gy, and m values from a value γ(n) to a value γ(n−m+1) are input as values of the yaw rate γ. It should be noted that in the following description, the inputs VP(n) to VP(n−m+1), Gy(n) to Gy(n−m+1), and γ(n) to γ(n−m+1), which are all input to the second neural network, are represented by inputs $x5_1$ to $x5_m$, $x5_{m+1}$ to $x5_{2m}$, and $x5_{2m+1}$ to $x5_{3m}$, respectively.

The above inputs $x5_1$ to $x5_{3m}$ are directly input from the 3m neurons of the input layer to each of the J neurons of the intermediate layer. The neurons of the intermediate layer calculate J intermediate outputs $a5_1$ to $a5_j$, respectively, by the following equation (16) each using the inputs $x5_1$ to $x5_{3m}$ and then output the respective intermediate outputs to the neuron of the output layer.

$$a5_j = f_{a5}\left(\sum_{i=1}^{3m} x5_i \cdot w5_{ji} - h5_j\right) \quad (16)$$

wherein $h5_j$ represents a predetermined threshold value, and $w5_{ji}$ represents a weight. As described hereinafter, the values $h5_j$ and $w5_{ji}$ are learned in advance in offline. Further, $f_{a5}$ represents an output function, and a sigmoid function is used as the output function $f_{a5}$, for example.

The neuron of the output layer calculates the second vehicle body slip angle β2 using the J intermediate outputs $a5_1$ to $a5_j$ input thereto, by the following equation (17):

$$\beta2 = f_{r5}\left(\sum_{j=1}^{J} a5_j \cdot v5_j - \theta5\right) \quad (17)$$

wherein θ5 represents a predetermined threshold value, which is learned in advance in offline, as described hereinafter. Further, $f_{r5}$ represents an output function, and e.g. a sigmoid function is used as the output function $f_{r5}$, similarly to the aforementioned output function $f_{a5}$.

The above threshold values $h5_j$ and θ5, and the weight $w5_{ji}$ are learned by the following method: The three inputs VP, Gy and γ and the output β are actually measured when the vehicle 3 is in the predetermined limit turning traveling state, and the threshold values $h5_j$ and θ5, and the weight $w5_{ji}$ are learned in offline using the above measured values by the back propagation method.

As described above, in the second vehicle body slip angle-calculating section 52, the second neural network calculates the second vehicle body slip angle β2, and uses values learned in advance in offline during the predetermined limit turning traveling state of the vehicle 3, as the threshold values h5$_j$ and θ5, and the weight w5$_{ji}$. That is, the second neural network calculates the second vehicle body slip angle β2 using the neural network model of which system identification is performed when the vehicle 3 is in the predetermined limit turning traveling state. Therefore, the second vehicle body slip angle β2 is calculated as a value accurately representing an actual vehicle body slip angle of the vehicle 3 in the predetermined limit turning traveling state.

Further, the turning state-determining section 53 (determination means) compares the absolute value |β1−β2| of the difference between the first vehicle body slip angle β1 and the second vehicle body slip angle β2, with a predetermined reference value β_REF, and sets the value of the limit state flag F_SLIP based on the result of the comparison.

More specifically, when |β1−β2|≧β_REF holds, it is determined that the vehicle 3 is in the predetermined limit turning traveling state, and to indicate the fact, the limit state flag F_SLIP is set to 1. On the other hand, when |β1−β2|<β_REF holds, it is determined that the vehicle 3 is in the normal turning traveling state, and to indicate the fact, the limit state flag F_SLIP is set to 0.

On the other hand, the selection section 54 (selection means) selects one of the first vehicle body slip angle β1 and the second vehicle body slip angle β2 as a selected value βd based on the limit state flag F_SLIP. More specifically, when F_SLIP=0 holds, which means that the vehicle 3 is in the normal turning traveling state, the first vehicle body slip angle β1 is selected as the selected value βd (βd=β1), and when F_SLIP=1 holds, which means that the vehicle 3 is in the predetermined limit turning traveling state, the second vehicle body slip angle β2 is selected as the selected value βd (βd=β2).

Then, the straight traveling-determining section 55 (straight traveling-determining means, and setting means) compares the accelerator pedal opening AP and the steering angle θst with the predetermined reference values AP_REF and θst_REF, respectively, and determines whether or not the vehicle 3 is in the straight traveling state, for calculation of the vehicle body slip angle β based on the result of the determination.

More specifically, when AP≦AP_REF or θst≧θst_REF holds, it is determined that the vehicle 3 is in the turning traveling state, and the vehicle body slip angle β is set to the above selected value βd (β=βd).

On the other hand, when AP>AP_REF and at the same time θst<θst_REF hold, it is determined that the vehicle 3 is in the straight traveling state, and the vehicle body slip angle β is set to 0 (β=0).

As described hereinabove, according to the vehicle body slip angle-estimating device 1A of the second embodiment, when the vehicle 3 is in the normal turning traveling state, the first vehicle body slip angle β1 is selected as the vehicle body slip angle β, whereas when the vehicle 3 is in the predetermined limit turning traveling state, the second vehicle body slip angle β2 is selected as the vehicle body slip angle β. The first vehicle body slip angle β1 is calculated by the neural network which uses the threshold values h4$_j$ and θ4, and the weight w4$_{ji}$ learned during the normal turning traveling of the vehicle 3, so that when the vehicle 3 is in the normal turning traveling state, i.e. in a turning traveling state which occurs with a high frequency, it is possible to accurately calculate the vehicle body slip angle β.

On the other hand, the second vehicle body slip angle β2 is calculated by the neural network which uses the threshold values h5$_j$ and θ5, and the weight w5$_{ji}$ learned during the predetermined limit turning traveling state of the vehicle 3, so that when the vehicle 3 is in the predetermined limit turning traveling state, i.e. even in a turning traveling state which occurs with a low frequency, it is possible to accurately calculate the vehicle body slip angle β. As described above, according to the vehicle body slip angle-estimating device 1A of the second embodiment, it is possible to accurately estimate the vehicle body slip angle β irrespective of whether the vehicle 3 is in the normal turning traveling state or in the predetermined limit turning traveling state, in other words, irrespective of the frequency of occurrence of the state during turning traveling of the vehicle 3. Further, the vehicle body slip angle-estimating device 1A configured as above can be realized by using the two neural network models.

Further, the turning state-determining section 53 compares the absolute value |β1−β2| of the difference between the first vehicle body slip angle β1 and the second vehicle body slip angle β2, with the predetermined reference value β_REF, to thereby determine whether or not the vehicle 3 is in the predetermined limit turning traveling state. This makes it possible to determine whether or not the vehicle 3 is in the predetermined limit turning traveling state, without using a particular detection means other than the wheel speed sensors 20, the lateral acceleration sensor 21 and the yaw rate sensor 22, thereby making it possible to reduce manufacturing costs of the vehicle body slip angle-estimating device.

It should be noted that although in the second embodiment, the first and second neural network models, which represent the relationship between the vehicle speed, the lateral acceleration, the yaw rate, and the vehicle body slip angle, are used as first and second predetermined nonlinear models, respectively, by way of example, the first and second nonlinear models according to the present invention are not limited to these, but any suitable nonlinear models may be used insofar as they represent at least the relationship between the vehicle speed, the lateral acceleration, the yaw rate, and the vehicle body slip angle, and at the same time system identification thereof is performed when the vehicle 3 is not in the predetermined turning traveling state and when the vehicle 3 is in the predetermined turning traveling state, respectively. For example, neural network models, each of which represents the relationship between not only the vehicle speed, the lateral acceleration, the yaw rate, and the vehicle body slip angle but also another parameter, such as the steering angle, may be used as the first and second nonlinear models, respectively. Furthermore, nonlinear two-degree-of-freedom models, each of which represents the relationship between the cornering forces of the front and rear wheels, the vehicle speed, the lateral acceleration, the yaw rate, the vehicle body slip angle, and the distances from the center of gravity of the vehicle to the front and rear axles of the vehicle, may be used as the first and second nonlinear models, respectively.

Further, although in the second embodiment, the absolute value |β1−β2| of the difference between the first vehicle body slip angle β1 and the second vehicle body slip angle β2 is compared with the predetermined reference value β_REF, to thereby determine whether or not the vehicle 3 is in a predetermined turning traveling state (i.e. the predetermined limit turning traveling state), by way of example, the determination method of the present invention is not limited to this, but any suitable determination method may be used insofar as it performs the determination based on one of the relative difference and ratio between the first vehicle body slip angle and the second vehicle body slip angle.

For example, there may be employed a method in which the ratio β2/β1 between the second vehicle body slip angle β2 and the first vehicle body slip angle β1 is compared with a predetermined reference value Rβ_REF, and when β2/β1≧Rβ_REF holds, it is determined that the vehicle 3 is in the predetermined limit turning traveling state, to set the limit state flag F_SLIP to 1, whereas when β2/β1<Rβ_REF holds, it is determined that the vehicle 3 is in the normal turning traveling state, to set the limit state flag F_SLIP to 0. Further, inversely to the above, the ratio β1/β2 may be compared with a predetermined reference value.

Furthermore, the vehicle speed VP may be calculated by the following equation (18) obtained by transforming the aforementioned equation (9), using the vehicle body slip angle β calculated in the immediately preceding control timing by each of the respective vehicle body slip angle-estimating devices 1 and 1A according to the above-described embodiments. In this case, the vehicle speed VP calculated by the equation (18) may be used as an input to the above-described respective neural networks.

$$VP = \frac{Gy}{\dot{\beta} + r} \quad (18)$$

It is further understood by those skilled in the art that the foregoing are preferred embodiments of the invention, and that various changes and modifications may be made without departing from the spirit and scope thereof.

What is claimed is:

1. A vehicle body slip angle-estimating device comprising:
   vehicle speed-detecting means for detecting a speed of a vehicle as a vehicle speed;
   lateral acceleration-detecting means for detecting a lateral acceleration of the vehicle as a lateral acceleration;
   yaw rate-detecting means for detecting a yaw rate of the vehicle;
   estimated value-calculating means for calculating an estimated value of a vehicle body slip angle with an algorithm that uses a predetermined nonlinear model indicative of a relationship between the vehicle speed, the lateral acceleration, the yaw rate, and the vehicle body slip angle;
   correction means for calculating a correction value with an algorithm that uses a predetermined linear model indicative of the relationship between the vehicle speed, the lateral acceleration, the yaw rate, and the vehicle body slip angle, and correcting the estimated value by the calculated correction value;
   determination means for determining whether or not the vehicle is in a predetermined limit turning traveling state but not in a normal turning traveling state, wherein the normal turning traveling state is a turning traveling state in which the absolute value of a vehicle body slip angle, if it is generated, is relatively small to fall within a predetermined range, and the predetermined limit turning traveling state is a state in which the vehicle is not in the normal turning traveling state but in a state in which a vehicle body slip angle exceeding the predetermined range is temporarily generated during turning traveling; and
   selection means for selecting the estimated value as the vehicle body slip angle when said determination means has determined that the vehicle is in the normal turning traveling state, and selecting the estimated value corrected by the correction value as the vehicle body slip angle when said determination means has determined that the vehicle is in the predetermined limit turning traveling state.

2. A vehicle body slip angle-estimating device as claimed in claim 1, wherein the predetermined nonlinear model is a predetermined neural network model, and
   wherein the algorithm using the predetermined linear model is an algorithm including a pseudo-integration method.

3. A vehicle body slip angle-estimating device as claimed in claim 2, wherein said correction means calculates the correction value by multiplying a value calculated by the pseudo-integration method by a predetermined gain.

4. A vehicle body slip angle-estimating device as claimed in claim 1, further comprising:
   straight traveling-determining means for determining whether or not the vehicle is in a straight traveling state; and
   setting means for setting the vehicle body slip angle to a value selected by said selection means when said straight traveling-determining means has determined that the vehicle is not in the straight traveling state, and setting the vehicle body slip angle to 0 when said straight traveling-determining means has determined that the vehicle is in the straight traveling state.

5. A vehicle body slip angle-estimating device as claimed in claim 4, further comprising:
   accelerator pedal opening-detecting means for detecting an accelerator pedal opening indicative of an operation amount of an accelerator pedal of the vehicle; and
   steering angle-detecting means for detecting a steering angle of a steering wheel of the vehicle, and
   wherein said straight traveling-determining means determines whether or not the vehicle is in the straight traveling state, based on results of comparison of the accelerator pedal opening and the steering angle with respective predetermined reference values thereof.

6. A vehicle body slip angle-estimating device comprising:
   vehicle speed-detecting means for detecting a speed of a vehicle as a vehicle speed;
   lateral acceleration-detecting means for detecting a lateral acceleration of the vehicle as a lateral acceleration;
   yaw rate-detecting means for detecting a yaw rate of the vehicle;
   first estimation means for estimating a first vehicle body slip angle with an algorithm that uses a first predetermined nonlinear model of which system identification is performed when the vehicle is in a normal turning traveling state and which is indicative of a relationship between the vehicle speed, the lateral acceleration, the yaw rate, and a vehicle body slip angle, wherein the normal turning traveling state is a turning traveling state in which the absolute value of a vehicle body slip angle, if it is generated, is relatively small to fall within a predetermined range;
   second estimation means for estimating a second vehicle body slip angle with an algorithm that uses a second predetermined nonlinear model of which system identification is performed when the vehicle is in a predetermined limit turning traveling state and which is indicative of the relationship between the vehicle speed, the lateral acceleration, the yaw rate, and the vehicle body slip angle, wherein the predetermined limit turning traveling state is a state in which the vehicle is not in the normal turning traveling state but in a state in which a vehicle body slip angle exceeding the predetermined range is temporarily generated during turning traveling;

determination means for determining whether or not the vehicle is in the predetermined limit turning traveling state; and selection means for selecting the first vehicle body slip angle as the vehicle body slip angle when said determination means has determined that the vehicle is in the normal turning traveling state, and selecting the second vehicle body slip angle as the vehicle body slip angle when said determination means has determined that the vehicle is in the predetermined limit turning traveling state.

7. A vehicle body slip angle-estimating device as claimed in claim 6, wherein said first predetermined nonlinear model is a first predetermined neural network model that uses weights learned when the vehicle is in the normal turning traveling state, and wherein said second predetermined nonlinear model is a second predetermined neural network model that uses weights learned when the vehicle is in the predetermined limit turning traveling state.

8. A vehicle body slip angle-estimating device as claimed in claim 6, wherein said determination means determines whether or not the vehicle is in the predetermined limit turning traveling state, based on one of a relative difference and a ratio between the first vehicle body slip angle and the second vehicle body slip angle.

9. A vehicle body slip angle-estimating device as claimed in claim 6, further comprising:

straight traveling-determining means for determining whether or not the vehicle is in a straight traveling state; and setting means for setting the vehicle body slip angle to a value selected by said selection means when said straight traveling-determining means has determined that the vehicle is not in the straight traveling state, and setting the vehicle body slip angle to 0 when said straight traveling-determining means has determined that the vehicle is in the straight traveling state.

10. A vehicle body slip angle-estimating device as claimed in claim 9, further comprising:

accelerator pedal opening-detecting means for detecting an accelerator pedal opening indicative of an operation amount of an accelerator pedal of the vehicle; and steering angle-detecting means for detecting a steering angle of a steering wheel of the vehicle, and wherein said straight traveling-determining means determines whether or not the vehicle is in the straight traveling state, based on results of comparison of the accelerator pedal opening and the steering angle with respective predetermined reference values thereof.

11. A vehicle body slip angle-estimating method comprising:

a vehicle speed-detecting step of detecting a speed of a vehicle as a vehicle speed;

a lateral acceleration-detecting step of detecting a lateral acceleration of the vehicle as a lateral acceleration;

a yaw rate-detecting step of detecting a yaw rate of the vehicle;

an estimated value-calculating step of calculating an estimated value of a vehicle body slip angle with an algorithm that uses a predetermined nonlinear model indicative of a relationship between the vehicle speed, the lateral acceleration, the yaw rate, and the vehicle body slip angle;

a correction step of calculating a correction value with an algorithm that uses a predetermined linear model indicative of the relationship between the vehicle speed, the lateral acceleration, the yaw rate, and the vehicle body slip angle, and correcting the estimated value by the calculated correction value;

a determination step of determining whether or not the vehicle is in a predetermined limit turning traveling state but not in a normal turning traveling state, wherein the normal turning traveling state is a turning traveling state in which the absolute value of a vehicle body slip angle, if it is generated, is relatively small to fall within a predetermined range, and the predetermined limit turning traveling state is a state in which the vehicle is not in the normal turning traveling state but in a state in which a vehicle body slip angle exceeding the predetermined range is temporarily generated during turning traveling; and a selection step of selecting the estimated value as the vehicle body slip angle when it is determined in said determination step that the vehicle is in the normal turning traveling state, and selecting the estimated value corrected by the correction value as the vehicle body slip angle when it is determined in said determination step that the vehicle is in the predetermined limit turning traveling state.

12. A vehicle body slip angle-estimating method as claimed in claim 11, wherein the predetermined nonlinear model is a predetermined neural network model, and wherein the algorithm using the predetermined linear model is an algorithm including a pseudo-integration method.

13. A vehicle body slip angle-estimating method as claimed in claim 12, wherein said correction step includes calculating the correction value by multiplying a value calculated by the pseudo-integration method by a predetermined gain.

14. A vehicle body slip angle-estimating method as claimed in claim 11, further comprising:

a straight traveling-determining step of determining whether or not the vehicle is in a straight traveling state; and a setting step of setting the vehicle body slip angle to a value selected in said selection step when it is determined in said straight traveling-determining step that the vehicle is not in the straight traveling state, and setting the vehicle body slip angle to 0 when it is determined in said straight traveling-determining step that the vehicle is in the straight traveling state.

15. A vehicle body slip angle-estimating method as claimed in claim 14, further comprising:

an accelerator pedal opening-detecting step of detecting an accelerator pedal opening indicative of an operation amount of an accelerator pedal of the vehicle; and a steering angle-detecting step of detecting a steering angle of a steering wheel of the vehicle, and wherein said straight traveling-determining step includes determining whether or not the vehicle is in the straight traveling state, based on results of comparison of the accelerator pedal opening and the steering angle with respective predetermined reference values thereof.

16. A vehicle body slip angle-estimating method comprising:

a vehicle speed-detecting step of detecting a speed of a vehicle as a vehicle speed;

a lateral acceleration-detecting step of detecting a lateral acceleration of the vehicle as a lateral acceleration;

a yaw rate-detecting step of detecting a yaw rate of the vehicle;

a first estimation step of estimating a first vehicle body slip angle with an algorithm that uses a first predetermined nonlinear model of which system identification is performed when the vehicle is in a normal turning traveling state and which is indicative of a relationship between the vehicle speed, the lateral acceleration, the yaw rate, and a vehicle body slip angle, wherein the normal turning traveling state is a turning traveling state in which the absolute value of a vehicle body slip angle, if it is generated, is relatively small to fall within a predetermined range;

a second estimation step of estimating a second vehicle body slip angle with an algorithm that uses a second predetermined nonlinear model of which system identification is performed when the vehicle is in a predetermined limit turning traveling state and which is indicative of the relationship between the vehicle speed, the lateral acceleration, the yaw rate, and the vehicle body slip angle, wherein the predetermined limit turning traveling state is a state in which the vehicle is not in the normal turning traveling state but in a state in which a vehicle body slip angle exceeding the predetermined range is temporarily generated during turning traveling;

a determination step of determining whether or not the vehicle is in the predetermined limit turning traveling state; and a selection step of selecting the first vehicle body slip angle as the vehicle body slip angle when it is determined in said determination step that the vehicle is in the normal turning traveling state, and selecting the second vehicle body slip angle as the vehicle body slip angle when it is determined in said determination step that the vehicle is in the predetermined limit turning traveling state.

17. A vehicle body slip angle-estimating method as claimed in claim 16, wherein the first predetermined nonlinear model is a first predetermined neural network model that uses weights learned when the vehicle is in the normal turning traveling state, and wherein the second predetermined nonlinear model is a second predetermined neural network model that uses weights learned when the vehicle is in the predetermined limit turning traveling state.

18. A vehicle body slip angle-estimating method as claimed in claim 16, wherein said determination step includes determining whether or not the vehicle is in the predetermined limit turning traveling state, based on one of a relative difference and a ratio between the first vehicle body slip angle and the second vehicle body slip angle.

19. A vehicle body slip angle-estimating method as claimed in claim 16, further comprising:

a straight traveling-determining step of determining whether or not the vehicle is in a straight traveling state; and a setting step of setting the vehicle body slip angle to a value selected in said selection step when it is determined in said straight traveling-determining step that the vehicle is not in the straight traveling state, and setting the vehicle body slip angle to 0 when it is determined in said straight traveling-determining step that the vehicle is in the straight traveling state.

20. A vehicle body slip angle-estimating method as claimed in claim 19, further comprising:

an accelerator pedal opening-detecting step of detecting an accelerator pedal opening indicative of an operation amount of an accelerator pedal of the vehicle; and a steering angle-detecting step of detecting a steering angle of a steering wheel of the vehicle, and wherein said straight traveling-determining step includes determining whether or not the vehicle is in the straight traveling state, based on results of comparison of the accelerator pedal opening and the steering angle with respective predetermined reference values thereof.

21. An engine control unit including a control program for causing a computer to execute a vehicle body slip angle-estimating method, wherein the vehicle body slip angle-estimating method comprises:

a vehicle speed-detecting step of detecting a speed of a vehicle as a vehicle speed;

a lateral acceleration-detecting step of detecting a lateral acceleration of the vehicle as a lateral acceleration;

a yaw rate-detecting step of detecting a yaw rate of the vehicle;

an estimated value-calculating step of calculating an estimated value of a vehicle body slip angle with an algorithm that uses a predetermined nonlinear model indicative of a relationship between the vehicle speed, the lateral acceleration, the yaw rate, and the vehicle body slip angle;

a correction step of calculating a correction value with an algorithm that uses a predetermined linear model indicative of the relationship between the vehicle speed, the lateral acceleration, the yaw rate, and the vehicle body slip angle, and correcting the estimated value by the calculated correction value;

a determination step of determining whether or not the vehicle is in a predetermined limit turning traveling state but not in a normal turning traveling state, wherein the normal turning traveling state is a turning traveling state in which the absolute value of a vehicle body slip angle, if it is generated, is relatively small to fall within a predetermined range, and the predetermined limit turning traveling state is a state in which the vehicle is not in the normal turning traveling state but in a state in which a vehicle body slip angle exceeding the predetermined range is temporarily generated during turning traveling; and a selection step of selecting the estimated value as the vehicle body slip angle when it is determined in said determination step that the vehicle is in the normal turning traveling state, and selecting the estimated value corrected by the correction value as the vehicle body slip angle when it is determined in said determination step that the vehicle is in the predetermined limit turning traveling state.

22. An engine control unit as claimed in claim 21, wherein the predetermined nonlinear model is a predetermined neural network model, and wherein the algorithm using the predetermined linear model is an algorithm including a pseudo-integration method.

23. An engine control unit as claimed in claim 22, wherein said correction step includes calculating the correction value by multiplying a value calculated by the pseudo-integration method by a predetermined gain.

24. An engine control unit as claimed in claim 21, wherein the vehicle body slip angle-estimating method further comprises:

a straight traveling-determining step of determining whether or not the vehicle is in a straight traveling state; and a setting step of setting the vehicle body slip angle to a value selected in said selection step when it is determined in said straight traveling-determining step that the vehicle is not in the straight traveling state, and setting the vehicle body slip angle to 0 when it is determined in said straight traveling-determining step that the vehicle is in the straight traveling state.

25. An engine control unit as claimed in claim 24, wherein the vehicle body slip angle-estimating method further comprises:
- an accelerator pedal opening-detecting step of detecting an accelerator pedal opening indicative of an operation amount of an accelerator pedal of the vehicle; and
- a steering angle-detecting step of detecting a steering angle of a steering wheel of the vehicle, and
- wherein said straight traveling-determining step includes determining whether or not the vehicle is in the straight traveling state, based on results of comparison of the accelerator pedal opening and the steering angle with respective predetermined reference values thereof.

26. An engine control unit including a control program for causing a computer to execute a vehicle body slip angle-estimating method,
- wherein the vehicle body slip angle-estimating method comprises:
- a vehicle speed-detecting step of detecting a speed of a vehicle as a vehicle speed;
- a lateral acceleration-detecting step of detecting a lateral acceleration of the vehicle as a lateral acceleration;
- a yaw rate-detecting step of detecting a yaw rate of the vehicle;
- a first estimation step of estimating a first vehicle body slip angle with an algorithm that uses a first predetermined nonlinear model of which system identification is performed when the vehicle is in a normal turning traveling state and which is indicative of a relationship between the vehicle speed, the lateral acceleration, the yaw rate, and a vehicle body slip angle, wherein the normal turning traveling state is a turning traveling state in which the absolute value of a vehicle body slip angle, if it is generated, is relatively small to fall within a predetermined range;
- a second estimation step of estimating a second vehicle body slip angle with an algorithm that uses a second predetermined nonlinear model of which system identification is performed when the vehicle is in a predetermined limit turning traveling state and which is indicative of the relationship between the vehicle speed, the lateral acceleration, the yaw rate, and the vehicle body slip angle, wherein the predetermined limit turning traveling state is a state in which the vehicle is not in the normal turning traveling state but in a state in which a vehicle body slip angle exceeding the predetermined range is temporarily generated during turning traveling;
- a determination step of determining whether or not the vehicle is in the predetermined limit turning traveling state; and
- a selection step of selecting the first vehicle body slip angle as the vehicle body slip angle when it is determined in said determination step that the vehicle is in the normal turning traveling state, and selecting the second vehicle body slip angle as the vehicle body slip angle when it is determined in said determination step that the vehicle is in the predetermined limit turning traveling state.

27. An engine control unit as claimed in claim 26, wherein said first predetermined nonlinear model is a first predetermined neural network model that uses weights learned when the vehicle is in the normal turning traveling state, and
- wherein said second predetermined nonlinear model is a second predetermined neural network model that uses weights learned when the vehicle is in the predetermined limit turning traveling state.

28. An engine control unit as claimed in claim 26, wherein said determination step includes determining whether or not the vehicle is in the predetermined limit turning traveling state, based on one of a relative difference and a ratio between the first vehicle body slip angle and the second vehicle body slip angle.

29. An engine control unit as claimed in claim 26, wherein the vehicle body slip angle-estimating method further comprises:
- a straight traveling-determining step of determining whether or not the vehicle is in a straight traveling state; and
- a setting step of setting the vehicle body slip angle to a value selected in said selection step when it is determined in said straight traveling-determining step that the vehicle is not in the straight traveling state, and setting the vehicle body slip angle to 0 when it is determined in said straight traveling-determining step that the vehicle is in the straight traveling state.

30. An engine control unit as claimed in claim 29, wherein the vehicle body slip angle-estimating method further comprises:
- an accelerator pedal opening-detecting step of detecting an accelerator pedal opening indicative of an operation amount of an accelerator pedal of the vehicle; and
- a steering angle-detecting step of detecting a steering angle of a steering wheel of the vehicle, and
- wherein said straight traveling-determining step includes determining whether or not the vehicle is in the straight traveling state, based on results of comparison of the accelerator pedal opening and the steering angle with respective predetermined reference values thereof.

* * * * *